United States Patent
Nathan et al.

(10) Patent No.: US 9,635,008 B2
(45) Date of Patent: *Apr. 25, 2017

(54) SYSTEMS AND METHODS FOR AUTHENTICATING AN AVATAR

(71) Applicant: Mark Stephen Meadows, Emeryville, CA (US)

(72) Inventors: Paco Xander Nathan, Austin, TX (US); Cathi Joann Cox, Los Angeles, CA (US); Florian Thomas Leibert, Am Weigert (DE); Mark Stephen Meadows, Emeryville, CA (US); Jan Susan Mallis, East Ballina (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,747

(22) Filed: Feb. 1, 2016

(65) Prior Publication Data
US 2016/0219031 A1 Jul. 28, 2016

Related U.S. Application Data

(63) Continuation of application No. 14/542,661, filed on Nov. 17, 2014, now Pat. No. 9,253,183, which is a
(Continued)

(51) Int. Cl.
*H04L 29/06* (2006.01)

(52) U.S. Cl.
CPC ........ *H04L 63/08* (2013.01); *H04L 29/06034* (2013.01)

(58) Field of Classification Search
CPC ............................ H04L 63/08; H04L 29/06034
See application file for complete search history.

(56) References Cited

U.S. PATENT DOCUMENTS 6,219,045 B1 * 4/2001 Leahy ................... H04L 65/403
  709/204
7,311,608 B1 * 12/2007 Danieli ................... A63F 13/12
  463/42

(Continued)

OTHER PUBLICATIONS

Jorissen et al., Dynamic Interactions in Physically Realistic Collaborative Virtual Environments, Dec. 2005, IEEE Transactions on Visualization and Computer Graphics, vol. 11, No. 6, pp. 649-660.*

*Primary Examiner* — Kenneth Chang
(74) *Attorney, Agent, or Firm* — Loza & Loza, LLP; Michael F. Fedrick

(57) ABSTRACT

Systems and methods for authenticating an avatar are provided. This system is useful with an avatar having an identifier, virtual environments, and a user who uses the avatar in the virtual environments. Transoms are generated, each with a unique identifier configured to exist in a specific location, and registered with an identity provider. The transom initiates a request. An offer is conveyed that includes the transom identifier, the location and the avatar identifier. The avatar is then authenticated by a shared secret. The identity provider then responds to the offer with avatar identification information, including reputation information. Reputation information is for the avatar and the user, and is compiled from external avatar data sources by using a trust matrix. An avatar gallery is generated by linking each avatar owned by each user to the account and compiling avatar profiles from the account, and the reputation information. The avatar profiles are searchable, and include micro formats.

10 Claims, 35 Drawing Sheets

Related U.S. Application Data continuation of application No. 11/694,156, filed on Mar. 30, 2007, now abandoned, which is a continuation-in-part of application No. 11/560,743, filed on Nov. 16, 2006, now abandoned.

(56) References Cited

U.S. PATENT DOCUMENTS

| | | | |
|---|---|---|---|
| 8,547,401 B2* | 10/2013 | Mallinson | A63F 13/02 345/632 |
| 2001/0037316 A1* | 11/2001 | Shiloh | G06F 21/6254 705/74 |
| 2003/0125973 A1* | 7/2003 | Mathews | G06Q 20/206 705/317 |
| 2003/0177187 A1* | 9/2003 | Levine | A63F 13/10 709/205 |
| 2003/0216962 A1* | 11/2003 | Heller | A63F 13/12 705/318 |
| 2004/0097287 A1* | 5/2004 | Postrel | G07F 17/32 463/41 |
| 2004/0179039 A1* | 9/2004 | Blattner | G06T 13/40 715/758 |
| 2005/0265550 A1* | 12/2005 | Tuyls | H04L 9/085 380/259 |
| 2006/0128460 A1* | 6/2006 | Muir | G07F 17/32 463/16 |
| 2006/0161435 A1* | 7/2006 | Atef | G06F 21/31 704/246 |
| 2006/0235790 A1* | 10/2006 | Jung | G06N 3/006 705/39 |
| 2006/0247055 A1* | 11/2006 | O'Kelley | A63F 13/12 463/42 |

* cited by examiner

SYSTEMS AND METHODS FOR AUTHENTICATING AN AVATAR

CROSS REFERENCE TO RELATED APPLICATIONS

This application is a continuation of U.S. patent application Ser. No. 14/542,661, filed on Nov. 17, 2014, which is a continuation of U.S. patent application Ser. No. 11/694,156, filed Mar. 30, 2007, which is a continuation-in-part of U.S. patent application Ser. No. 11/560,743, filed on Nov. 16, 2006 and entitled "Systems And Methods For Managing A Persistent Virtual Avatar With Migrational Ability." The present application claims the benefit of priority under 35 U.S.C. §120 from the foregoing applications, and the foregoing applications are incorporated by reference herein in their entirety.

BACKGROUND OF THE INVENTION

The present invention relates to a system and method for authenticating an avatar, and more particularly authenticating an avatar with reputation information from a centralized identity provider. Such an authentication system is useful in conjunction with security and identification within Massively Multiplayer Online Games (MMOGs), virtual worlds, and online social networks. Currently, at best, identification and reputation within virtual environments is highly fragmented among each individual virtual world. More often, however, there is an utter lack of identification and reputation within the virtual environments. The fact that identity and reputation within virtual worlds is so elusive results in heightened risk when sharing important information, such as in financial transactions.

An avatar is a virtual representation of an individual within a virtual environment. Avatars often include physical characteristics, statistical attributes, inventories, social relations, emotional representations, and weblogs (blogs) or other recorded historical data. Avatars may be human in appearance, but are not limited to any appearance constraints. Avatars may be personifications of a real world individual, such as a Player Character (PC) within a MMOG, or may be an artificial personality, such as a Non-Player Character (NPC). Additional artificial personality type avatars include personal assistants, guides, educators, answering servers and information providers. Additionally, some avatars may have the ability to be automated some of the time, and controlled by a human at other times. Such Quasi-Player Characters (QPCs) may perform mundane tasks automatically, but more expensive human agents take over in cases of complex problems.

Avatars, however, exist in virtual worlds that embrace anonymity. An avatar may appear any way the author of the avatar, or end user, desires. Moreover the name, appearance, and statistics of an avatar may often be changed on a whim An end user may have several avatars for any virtual environment, and connecting an avatar to its end user is difficult at best.

The number of active subscribers to MMOGs is at least 10 million people. Each person pays $15 and up a month to play these games, and maybe an additional 20 million people login occasionally. Estimates are that players spent about $1 billion in real money in 2005 on virtual goods and services for MMOGs combined. Moreover, at least 1.5 million people subscribe to virtual worlds. In January, 2006, inside one such virtual social world, people spent nearly $5 million in some 4.2 million transactions buying or selling clothes, buildings, and the like. Moreover, participants in web communities number in the multiple tens of millions. Every day, these participants engage in financial transactions. Additionally, access to certain information, subsets of the virtual world, or services may be restricted to certain participants only. Such activities produce a large risk for the parties involved, much of the risk stemming from identity ambiguities.

Currently, when a party wishes to provide sensitive information, transfer goods or allow access to an avatar embodied end user, local reputation of the avatar, if available, is often the only assurances the party has, since there is currently no way to ascertain end user reputation beyond the limited reputation of each individual avatar's local reputation. End users may improperly use received information, misrepresent themselves to gain access, or breach contract since there is usually no repercussions to the end user because, with a simple change in identity, the wrong deed is no longer traceable to the end user. Thus, it would be advantageous to have a system enabled to compile the end user's reputation, rather than a single avatars reputation, in order to dictate online transactions.

Moreover, such a system of authentication may be utilized to provide highly targeted marketing. By compiling users' preferences, highly refined advertisements may be generated for the end user, however, without knowledge of an avatar's identity, such refined advertisements are ineffectual. This further reinforces the need of a system for authenticating an avatar for identity.

Additionally, due to the fragmented multitudes of virtual worlds, it is also important for such an authentication system to be available across multiple platforms. Effectively, by removing the authentication system from any singular virtual world, and enabling a global system, reputation and identity information may be more accurately compiled. Also, such a system enables secure communications between individuals that are inhibiting separate virtual worlds by verifying identity of the individuals within each virtual environment. Systems for authenticating an avatar's users' identity and supplying reputation information in this manner do not currently exist.

Additionally, due to the frequency of financial transactions, and the regularity of access inquiries, such authentications are preferably performed rapidly, with a minimal interference to the end user and transacting party. As such, it is desirable to have a system for authenticating an avatar's end users' identity and supplying reputation information that is integrated into the virtual environment for rapid and efficient authentication.

It is therefore apparent that an urgent need exists for a system and method for authenticating avatars that integrates the ability to provide reputation information of the avatar's user. This system would be able to provide increased security in online transactions, enable targeted marketing and promote heightened accountability for participants in virtual worlds.

SUMMARY OF THE INVENTION

To achieve the foregoing and in accordance with the present invention, systems for vetting and authenticating an avatar, and methods for providing identity and reputation information are provided. Such systems and methods are useful for increasing security in online transactions, enabling targeted marketing and promoting heightened accountability for participants in virtual worlds.

Systems and methods for authenticating an avatar, or virtual entity, for identity are useful in conjunction with a virtual entity, virtual environments, and a second user, a first user and an identity registrar. The end user uses the virtual entity in the virtual environments. Transoms are generated. A first user manages the transom. Each transom has a unique identifier and is registered with an identity provider. The transom initiates a request.

The virtual entity has an identifier. An offer is conveyed that includes the transom identifier, the transom location and the virtual entity identifier. The virtual entity is then is then authenticated by utilizing a shared secret. Authenticating the virtual entity includes determining if the virtual entity has been previously authenticated. If the virtual entity has been previously authenticated, then the virtual entity is re-authenticated. Otherwise, the user is redirected to a user agent, who includes a nonce, and a new account is generated for the user, with the identity provider. Redirection by the user agent is done in-world if the virtual environment supports user agent protocol; otherwise the user is redirected out of world. The user is then logged into the account and the virtual entity is then authenticated.

The Identity Registrar then responds to the offer with vetted virtual entity identification information, which may include reputation information. Reputation information is for the virtual entity and the user.

Vetted virtual entity identity information is compiled for the user and each virtual entity from external virtual entity data sources by using a trust matrix. The trust matrix generates a trust rating for the user by analyzing relationships between the user and the First User through at least one intermediate party.

Additionally, a virtual entity gallery may then be generated by linking each virtual entity owned by each end user to the account and compiling virtual entity profiles from the account, the vetted virtual entity information. The virtual entity profiles are searchable, and include micro formats.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, one embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to systems and methods for managing persistent virtual avatars, and more particularly persistent virtual avatars that have the ability to migrate, and have cross-membrane capacity. Such avatars are useful in conjunction with Massively Multiplayer Online Games (MMOGs), virtual social worlds and online web communities, generically referred to as "virtual environments". All virtual environments may be collectively referred to as the "virtual universe". A persistent avatar may be a character, non-player character, quasi-player character, agent, personal assistant, personality, guide, representation, educator or any additional virtual entity that requires persistence between virtual environments. In a society of ever increasing reliance and blending between real life and our virtual lives, the ability to migrate seamlessly between virtual environments with a substantially constant set of attributes is highly desirable and advantageous.

Figure 1A:
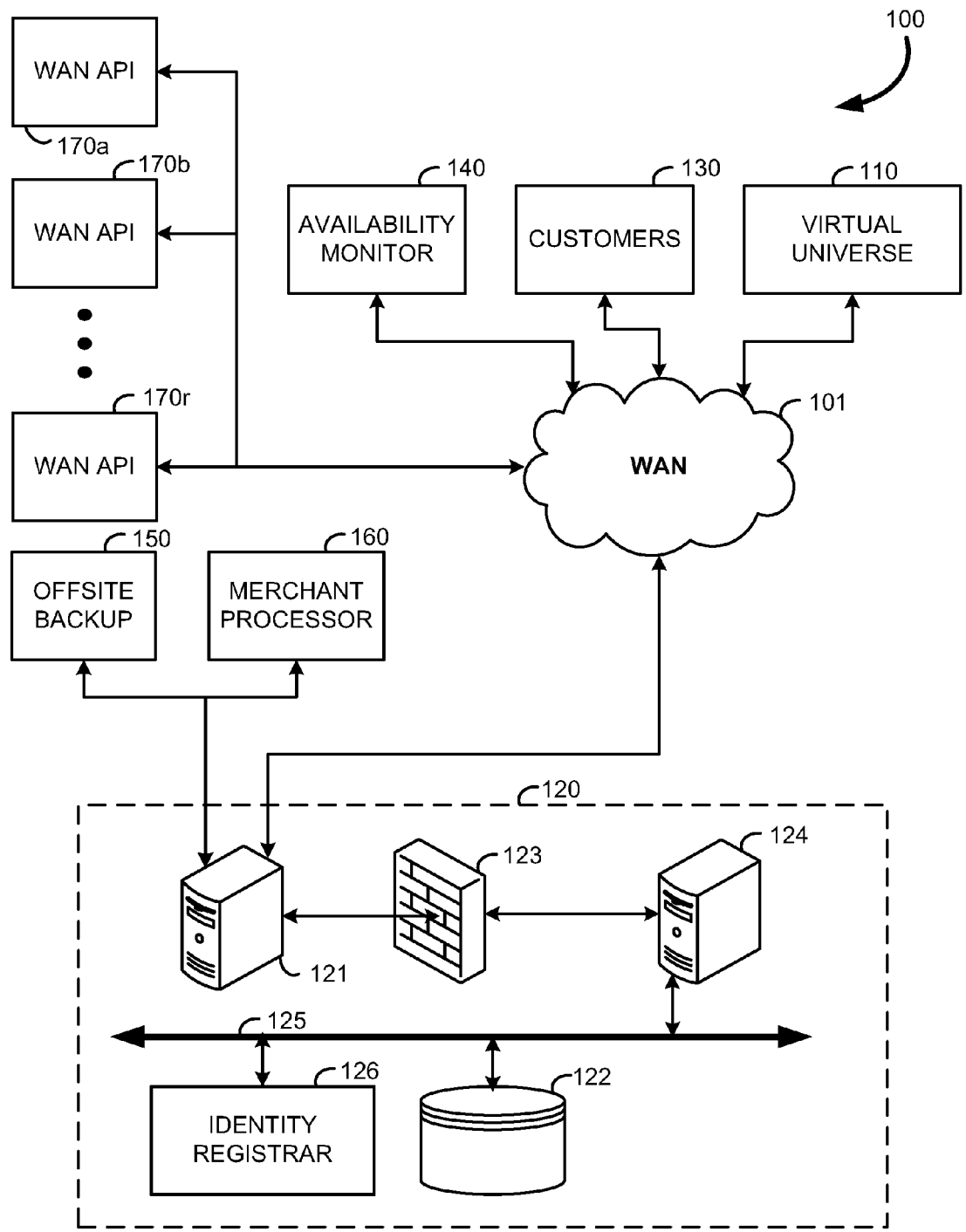
FIG. 1A shows a schematic block diagram illustrating a persistent avatar management system in accordance with an embodiments of the present invention.

To facilitate discussion, FIG. 1A shows a schematic block diagram 100 illustrating a persistent avatar management system in accordance with an embodiment of the present invention. A Wide Area Network (WAN) 101 provides a medium for all other components to communicate and have access to one another. In some embodiments the WAN 101 may be the Internet, however any WAN may be used as is known by those skilled in the art. Network connections are made through 10/100/1000 Megabit/sec Ethernet cable, although other network wiring technologies, such as high speed optical cable, may also be used. Additionally, Wireless mesh networks may also be used to couple wired networks, network devices, or access points, as is well known by those skilled in the art.

Virtual Universe 110 is coupled to the WAN 101 for access by the Customers 130. The term Customers 130 includes users who use the persistent avatar, and owners who own the persistent avatars. In some embodiments the user of a particular avatar may also be the Avatar's owner. Alternatively, the owner and the user may be separate individuals. Moreover, the user and owner may include multiple individuals or organizations, such as a corporation. In some embodiments, some or all of these permutations of user and owner may constitute the Customers 130. The Virtual Universe 110 may be accessed by the persistent avatars. Once accessed, the persistent avatar may engage in the Virtual Universe 110 in at least all capacities that a native avatar is able. Additionally, the persistent avatar may communicate with other virtual environments within the Virtual Universe 110, or with the real world.

In some embodiments, an Availability Monitor 140 also may couple to the WAN 101. The Availability Monitor 140 may provide constant monitoring of critical services for troubleshooting and downtime reduction purposes. In many cases, the Availability Monitor 140 may be located in many different geographical locations, so that a "triangulation" of service availability problems may be preformed.

A Network Operation Center (NOC) 120 includes at least one Public Server 121 coupled to an Internal Server 124 through a Firewall 123. The Internal Server 124 may couple to a Local Area Network (LAN) 125. The Firewall 123 limits assess by Customers 130 and unauthorized parties into the LAN 125. Additionally, communication between the Public Server 121 and the Internal Server 124 through the Firewall 123 may utilize Network Address Translation (NAT) as is well known by those skilled in the art. Public Server 121, Firewall 123 and Internal Server 124 may be separate physical entities. Alternatively, the Public Server 121, Firewall 123 and Internal Server 124 may be housed within a single server. Additionally, Database 122 is coupled to the LAN 125. The Database 122 may include customer account information, persistent avatar attribute data and avatar conversational data for data mining Due to the vast amount of avatar data within the Database 122 a data management system for infrequently accessed information may be utilized to increase Database 122 performance An Identity Registrar 126 may be coupled to the LAN 125. Identity Registrar 126 may form an integral part of identity authentication. Additional components may be coupled to the LAN 125 that are not shown. These components may include printers, additional databases, additional servers, telephone networks, fax, routers or other network devices.

The NOC 120 may be in a single location, however in some embodiments the NOC 120 may be distributed over multiple locations for increased reliability and efficiency, and reduced vulnerability to NOC 120 disruption and disaster.

The Public Server 121 couples the NOC 120 to the WAN 101. Additionally, in some embodiments, a Merchant Processing 150 and Offsite Backup 160 may independently couple to the Public Server 121. Alternatively, Merchant Processing 150 and Offsite Backup 160 may couple to the Public Server 121 through the WAN 101. Due to the variability of viable currencies existing within Virtual Universe 110 Merchant Processing 150 allows payment through unconventional means, thus increasing the available Customers 130 base. Examples of unconventional payments available through Merchant Processing 150 include, but are not limited to, PayPal, Linden Dollars and Google Checkout.

Offsite Backup 160 provides for operational data to be store in a safe means. In some embodiments, Offsite Backup 160 may include a third party. Offsite Backup 160 may include, but is not limited to disk images for each kind of server configuration, source code repositories, customized third-party software on intranet, database contents, email archives and server logs. A server state (web sites, customer services, etc.) may be recovered from Offsite Backup 160. Offsite Backup 160 acts as an insurance against disaster or other NOC 120 disruptions.

In some embodiments, the NOC 120 may access multiple WAN Application Programming Interfaces (APIs), 170a, 170b through 170r, that may be coupled to the WAN 101. The WAN APIs 170a, 170b to 170r functionalities may then be integrated into the persistent avatars capabilities.

Figure 1B:
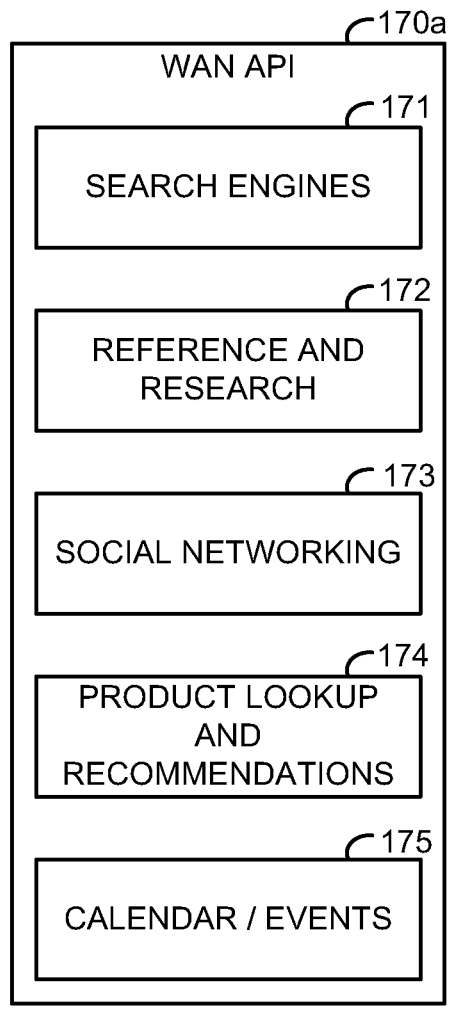
FIG. 1B shows a functional block diagram of wide area network application programming interfaces for the persistent avatar management system of FIG. 1.

FIG. 1B shows a functional block diagram of an exemplary Wide Area Network Application Programming Interface 170a for the persistent avatar management system of FIG. 1. Possible WAN API 170a included within avatar capabilities includes Search Engines 171, References and Research Tools 172, Social Networking Tools 173, Product Lookup and Recommendations 174, and Calendars or Planners 175. The illustrated categories of WAN APIs 170a, 170b to 170r listed is not an exhaustive list, however. Additionally, different WAN APIs 170a, 170b to 170r may be provided to different Customers 130. In some embodiments the Customers 130 may be able to choose the WAN APIs 170a, 170b to 170r integrated into the persistent Avatar's capabilities. Moreover, in some embodiments, the WAN API 170a may only be accessible to the persistent avatar when the avatar is within particular Virtual Environment 211b.

Figure 2A:
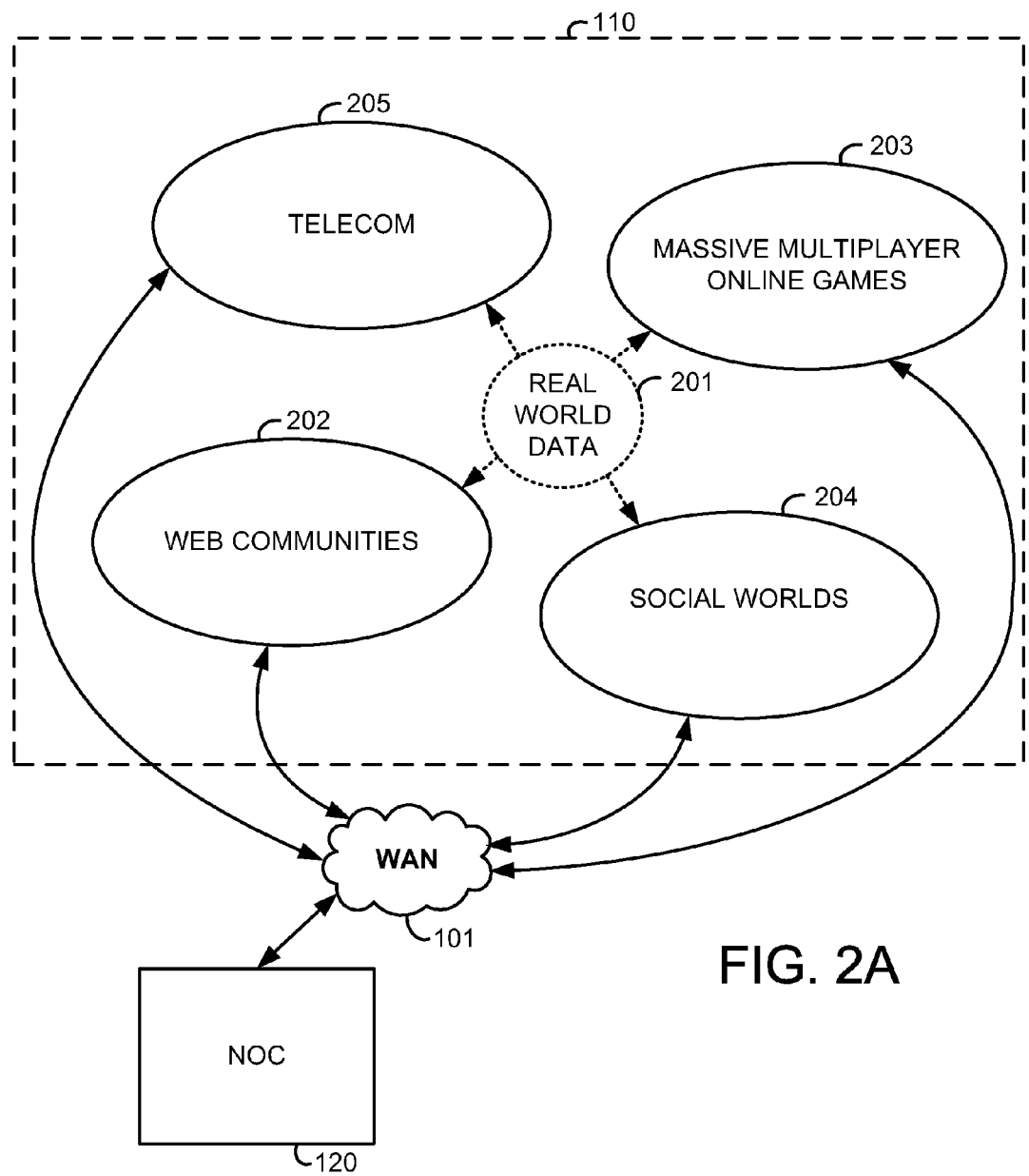
FIG. 2A shows a schematic block diagram of the virtual universe for the persistent avatar management system of FIG. 1.

FIG. 2A shows a schematic block diagram of the Virtual Universe 110 for the persistent avatar management system of FIG. 1. The Virtual Universe 110 may be broken down into five subcategories: Virtual Overlays of Real World Data 201, WEB Communities 202, Massively Multiplayer Online Games (MMOGs) 203, Social Worlds 204, and Telecom 205. Examples of Virtual Overlays of Real World Data 201 include, but are not limited to, Google Earth and Microsoft Flight Simulator X. Examples of WEB Communities 202 include, but are not limited to, YouTube and MySpace. Examples of MMOGs 203 include, but are not limited to, World of Warcraft, Guild Wars and Hive. Examples of Social Worlds 204 include, but are not limited to, Second Life and Neopets. Examples of Telecom 205 include, but are not limited to, cell phones, BlackBerry Devices and Personal Digital Assistants (PDA). Additional subcategories may exist, or may emerge with new technology. It is intended that these additional subcategories be incorporated into the Virtual Universe 110. The NOC 120 is coupled to the subcategories of the Virtual Universe 110 through the WAN 101.

Figure 2B:
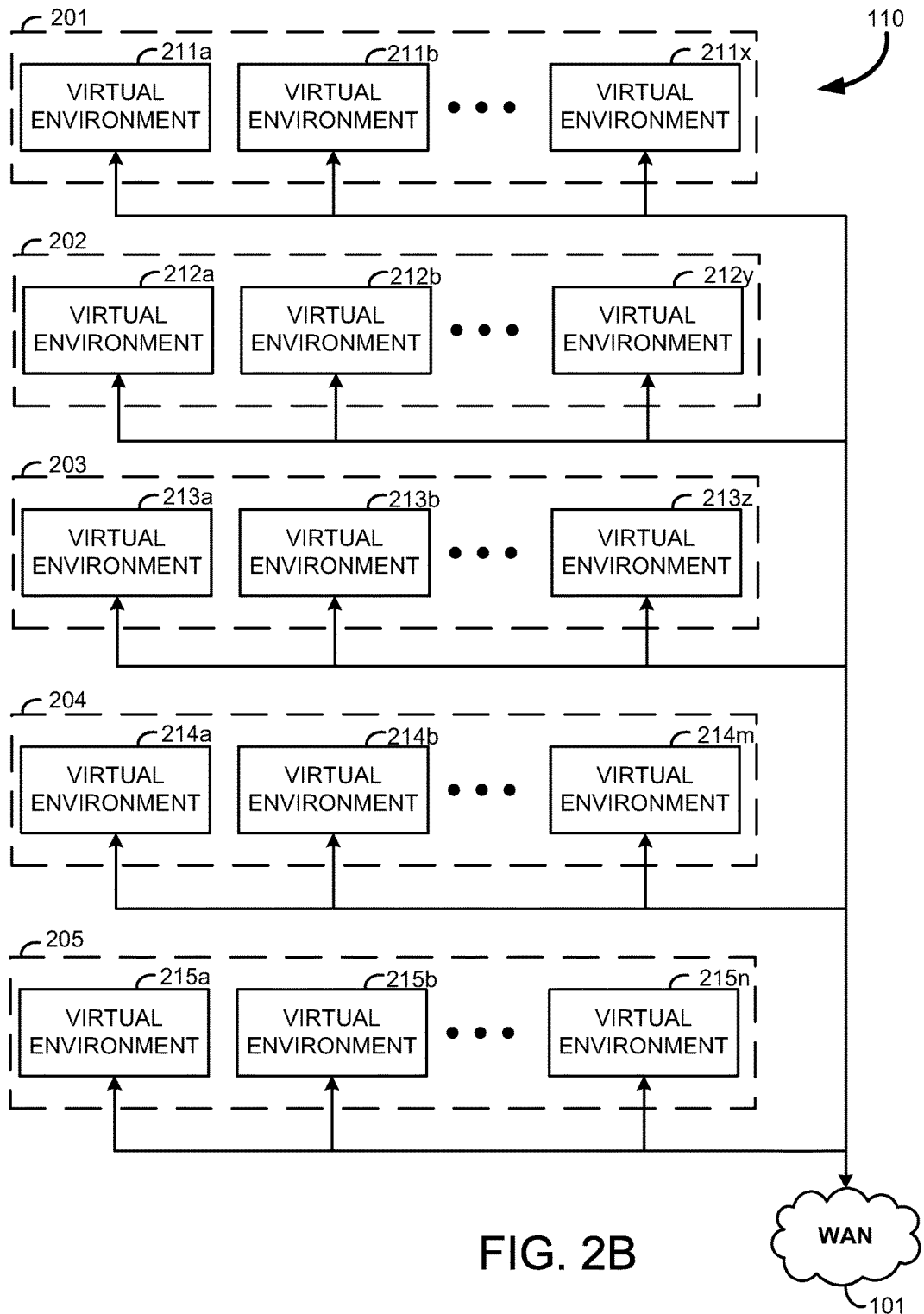
FIG. 2B shows a logical block diagram of virtual environments for the persistent avatar management system of FIG. 1.
Figure 3:
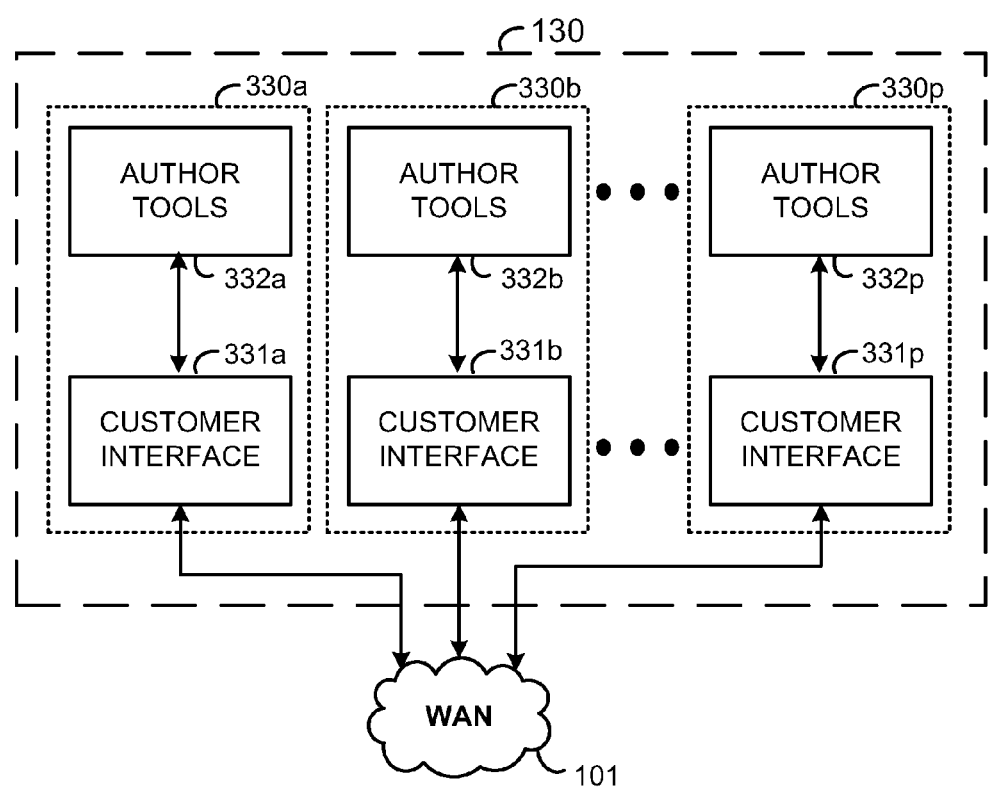
FIG. 3 shows a logical block diagram of user components for the persistent avatar management system of FIG. 1.

A logical block diagram of the Virtual Universe 110 is shown in FIG. 2B. Each Virtual Environments 211a, 211b to 211x, 212a, 212b to 212y, 213a, 213b to 213z, 214a, 214b to 214m, 215a, 215b to 215n is coupled to the WAN 101. Each subcategory, Virtual Overlays of Real World Data 201, WEB Communities 202, MMOGs 203, and Social Worlds 204, and Telecom 205, may include multiple Virtual Environments 211a to 215n. Moreover, some Virtual Environments 211a to 215n may be hybrids of these subcategories. Thus, while the line between specific subcategories may become increasingly indistinct, the boundaries between individual Virtual Environments 211a to 215n are distinct and nearly impassable. Occasionally, the Virtual Overlays of Real World Data 201 have provided some connectivity between Virtual Environments 211a to 215n as shown in FIG. 3; however this connectivity is limited in scope. The NOC 120, on the other hand, is able to access all the Virtual Environments 211a to 215n thereby providing a bridging mechanism to allow for persistent avatars to migrate from any Virtual Environment 211b to another Virtual Environment 211b.

Figure 2C:
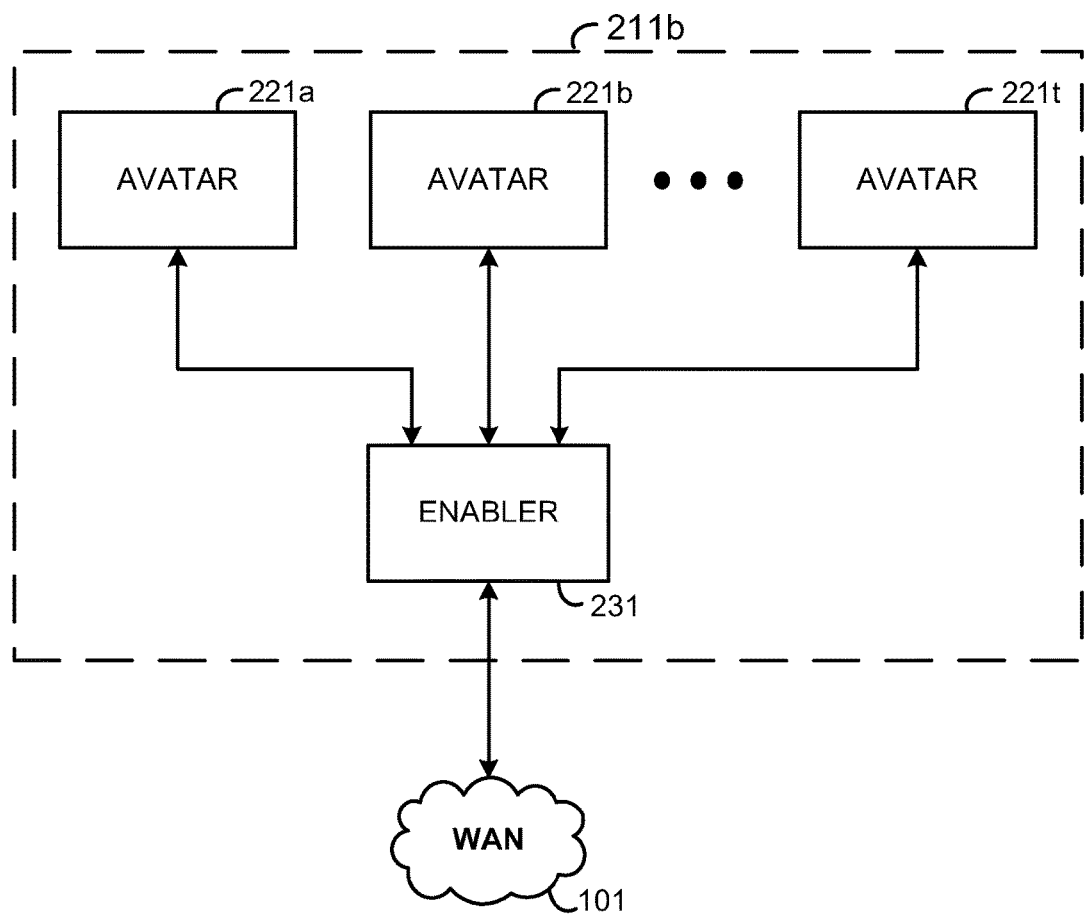
FIG. 2C shows a schematic block diagram of a virtual environment for the persistent avatar management system of FIG. 1.

A logical block diagram of an exemplary Virtual Environment 211b is shown in FIG. 2C. Within each Virtual Environment 211b exists an Enabler 231. The Enabler 231 allows for Persistent Avatar 221a, 221b to 221t to access the WAN 101, and eventually the NOC 120. In some embodiments, each Virtual Environment 211b has a corresponding Enabler 231. However, any number of Persistent Avatars 221a to 221t may exist within a Virtual Environment 211b at any given time. Additionally, due to the migratory nature of the Persistent Avatars 221a to 221t, the number of Avatars 221a to 221t within the Virtual Environments 211b is in flux.

Figure 2D:
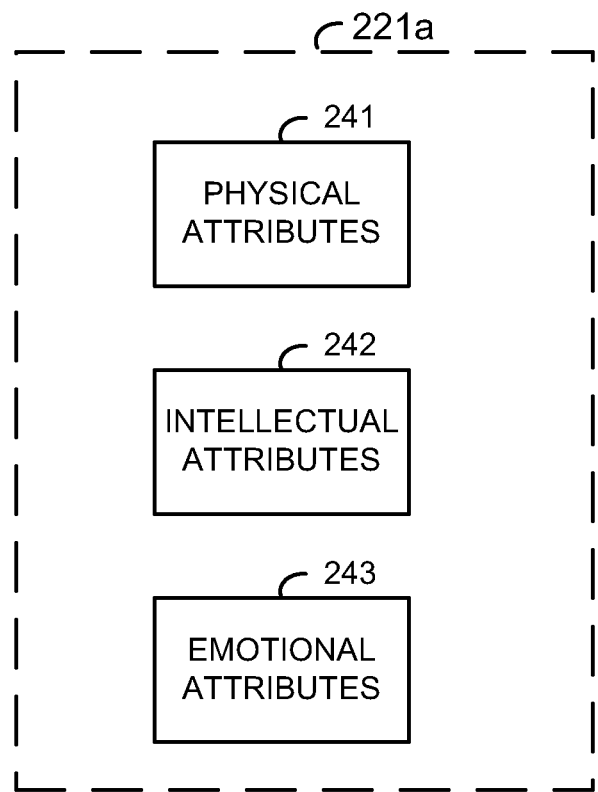
FIG. 2D shows a schematic block diagram of an avatar for the persistent avatar management system of FIG. 1.

A logical block diagram of an exemplary Persistent Avatar 221a is shown in FIG. 2D. In some embodiments, Persistent Avatar 221a may include Physical Attributes 241, Intellectual Attributes 242 and Emotional Attributes 243. Physical Attributes 241 may include Avatar's 221a physical statistics, such as strength, and appearance data. Intellectual Attributes 242 may include the Avatar's 221a backstory, history and memory. Emotional Attributes 243 may include the Avatar's 221a emotional disposition, and reaction and response algorithms FIG. 3 shows a logical block diagram of End User Components 330a, 330b to 330p for the persistent avatar management system of FIG. 1. Each customer of the Customers 130 includes an End User Component 330. In some embodiments, the End User Component 330a, 330b to 330p includes Author Tools 332a, 332b to 332p, respectively, that are coupled to the WAN 101 through Customer Interface 331a, 331b to 331p, respectively. The Author Tools 332a to 332p provides user management of the Persistent Avatar 221a. In some embodiments, each Customer 130 may own or use multiple Persistent Avatars 221a to 221t.

Figure 4A:
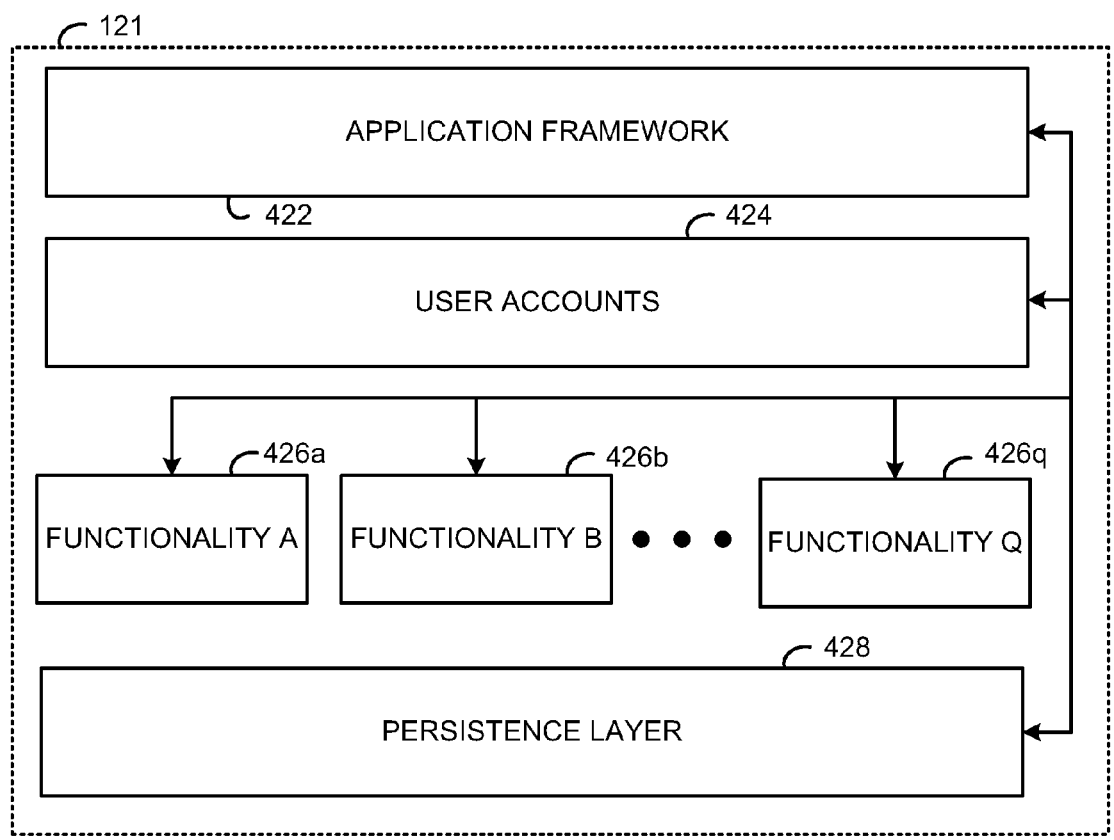
FIG. 4A shows a functional block diagram of the server architecture for the persistent avatar management system of FIG. 1.

FIG. 4A shows a functional block diagram of the server architecture for the persistent avatar management system of FIG. 1. In some embodiments, Server 121 includes an Application Framework 422, User Accounts 424, multiple Functionality Modules 426a, 426b to 426q and a Persistence Layer 428. The Application Framework 422 integrates and unifies Service Oriented Architecture (SOA) technologies. User Accounts 424 provides back access to the Customer Interfaces 330. The Persistence Layer 428 provides object/relational persistence and query service. The Functionality Modules 426a to 426q provide additional functional components for NOC 120 driven Persistent Avatars 221a to 221t.

Figure 4B:
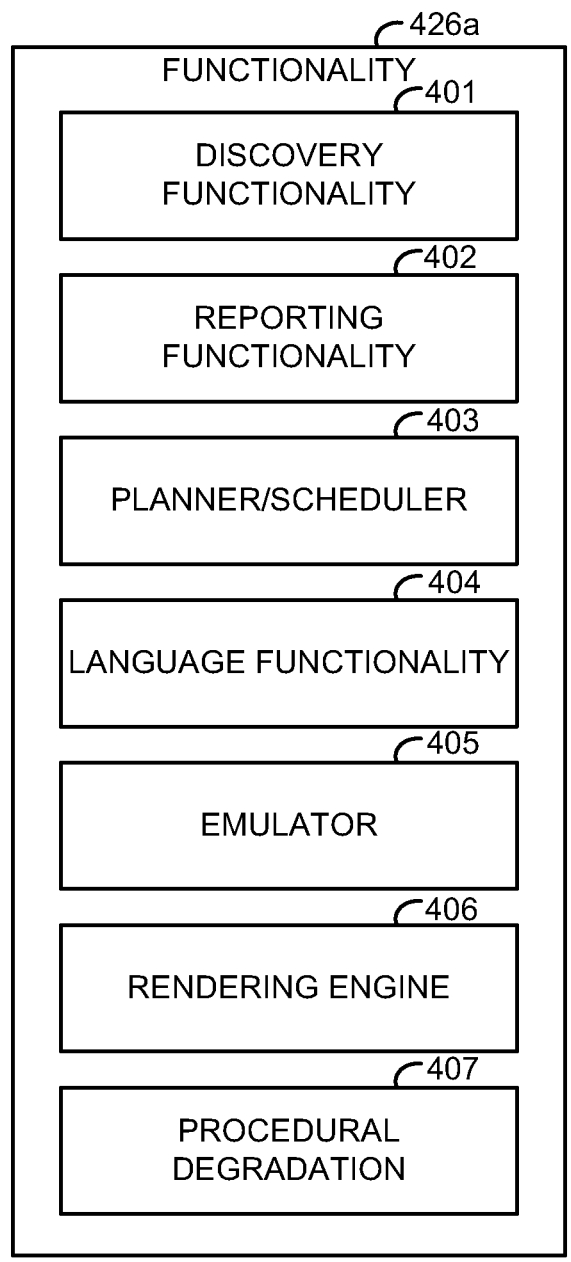
FIG. 4B shows a functional block diagram of the functionality modules for the persistent avatar management system of FIG. 1.

FIG. 4B shows a functional block diagram of exemplary Functionality Modules 426a for the persistent avatar management system of FIG. 1. In some embodiments, Functionality Modules 426a include a Discovery Functionality 401, a Reporting Functionality 402, a Planner and Scheduler 403, a Language Functionality 404, Emulators 405, a Rendering Engine 406, and a Procedural Degradation 407. The illustrated Functionality Modules 426a is not an exhaustive list, however, and additional Functionality Modules 426a to 426q may be incorporated as need dictates. The Discovery Functionality 401 provides text data mining, simulations and evolving algorithms The Reporting Functionality 402 may include reporting usage, revenues, security attacks and similar statistically significant data. The Planner and Scheduler 403 may determine a sequence of actions, wherein the actions are related activities, and then coordinates the timing for the actions. In some embodiments these functions may be externalized when Avatar 221a serves as a "personal assistant". For example, Avatar 221a takes some responsibilities for planning the owner's schedule, such as for calls and appointments. The Language Functionality 404 includes grammatical parsing, statistical parsing and subsequent emotional assessment of text dialog. The Emulators 405 provide the ability to emulate corresponding Virtual Environments 211a to 215n. In some embodiments, the Emulators 405 may simulate the area most local to the Avatar 221a and base decisions on the approximations generated by the simulation. The Rendering Engine 406 provides the ability to render Persistent Avatars' 221a to 221t appearance. The Procedural Degradation 407 matches the level of rendering to the capabilities of the target Virtual Environment 211b. Procedural Degradation 407 may drive the Rendering Engine 406. Each Virtual Environment 211b tends to have its own unique set of features and limitations. For example, a model used to generate the "physical embodiments" of Avatar 221a may render as 3D with facial expression in one Virtual Environment 211b, but may need to be rendered as a 2D image for use as Avatar 221a in another of Virtual Environments 211a to 215n.

Figure 5:
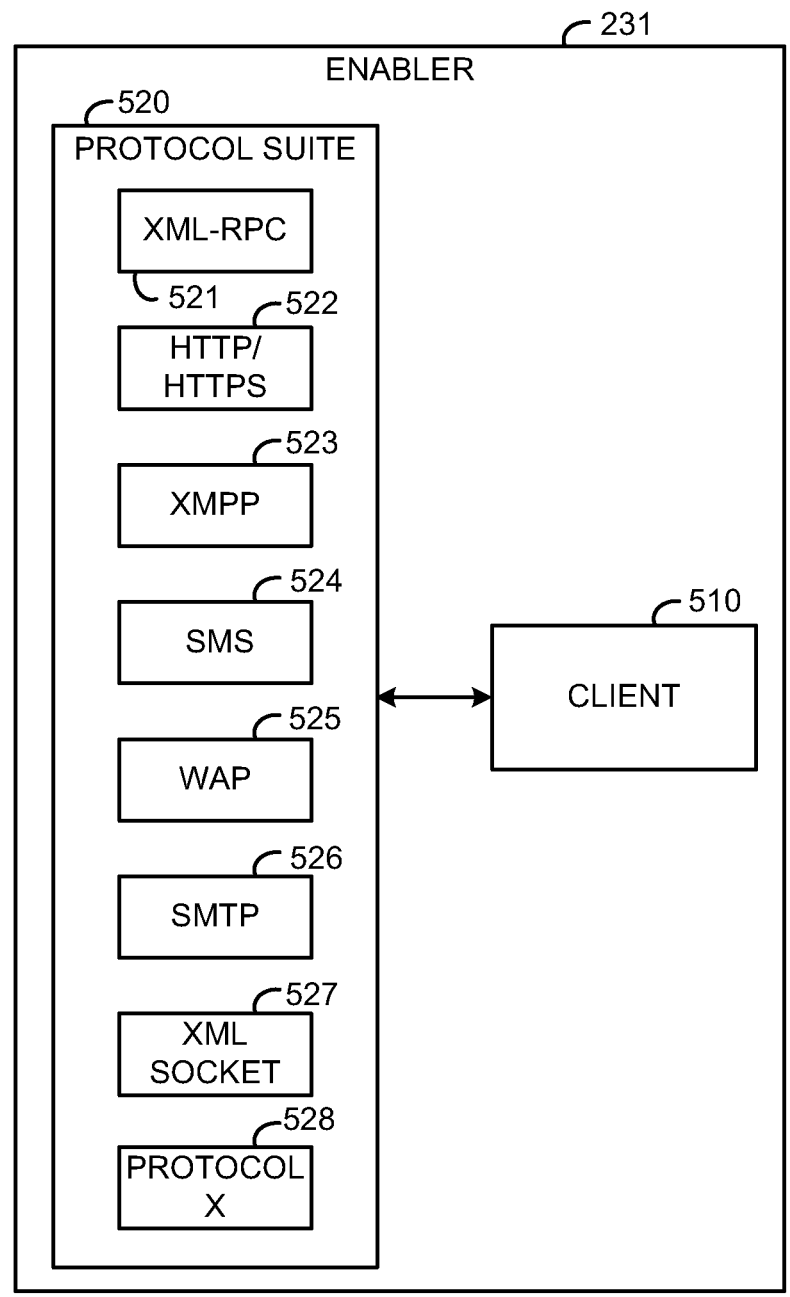
FIG. 5 shows a functional block diagram of an enabler for the persistent avatar management system of FIG. 1.

FIG. 5 shows a functional block diagram of the Enabler 231 for the persistent avatar management system of FIG. 1. The Enabler 231 includes a Client 510 that utilize a Protocol Suite 520. In some embodiments, the Protocol Suit 520 includes protocols such as XML-RPC 521, HTTP/HTTPS 522, XMPP 523, SMS 524, WAP 525, SMTP 526, XML Socket 527, and Protocol X 528. Protocol X 528 may include any additional protocols as they become advantageous to include within the Protocol Suite 520. In some embodiments the Enabler 231 is platform dependent, and uses native language of the Virtual Environments 211a to 215n. Depending on the embodiments the Client 510 may be a thin or thick Client 510. Enabler 231 may be limited as to avoid the risk of being locked into any particular Virtual Environment 211b. Dependent upon implementation The Enabler 231 may exist within the Virtual Environments 211a to 215n as either integrated software, or as independent hardware. In some embodiments, the Enabler 231 may exist within the NOC 120. In alternate embodiments, the Enabler 231 may exist with the Customers 130. In these embodiments the Customers 130 may additionally include the Database 122 and Server 121 thereby circumventing the need for any centralized NOC 120.

Figure 6:
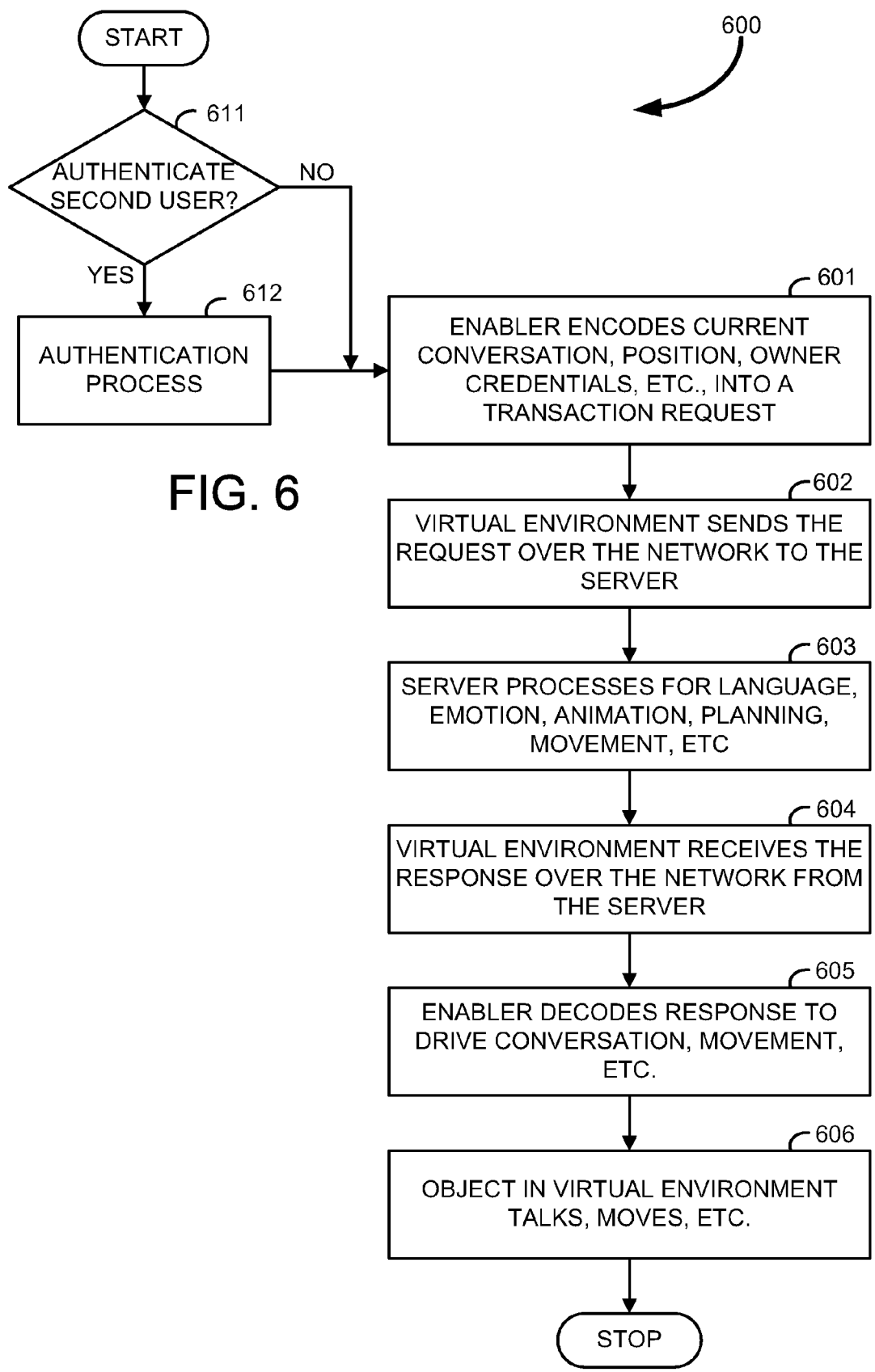
FIG. 6 shows a flow chart illustrating the process for enabling a virtual environment through the enabler for the persistent avatar management system of FIG. 1.

FIG. 6 shows a flow chart illustrating the process 600 for enabling a Virtual Environment 211b through the Enabler 231. The process begins at step 611, where a determination is made if this is an authentication transaction for a user. If this is an authentication transaction the authentication process is performed at step 612. Then at step 601, the Enabler 231 encodes current conversation, position, owner credentials, attribute data and any other data necessary to drive the Avatars 221a to 221t, into a transaction request for use by the Server 121.

Else, if at step 611 the authentication is not required the process progresses directly to step 601. In some embodiments, the encoding takes place within the Virtual Environment 211b that the Avatar 221a is located.

In step 602 the Virtual Environment 211b sends the transaction request over the WAN 101 to the Server 121.

In step 603 the Server 121 processes the encoded data for language, emotion, animation, planning, and movement and attribute changes. The Server 121 may then make modifications to the avatars 221a attribute data.

In step 604 the Virtual Environment 211b receives the response to the transaction request over the WAN 101 from the Server 121.

In step 605 the Enabler 510 decodes response from the server to drive conversation, movement, actions or animations.

In step 606 the Persistent Avatar 221a in the Virtual Environment 211b talks, moves, acts or gestures.

Figure 7:
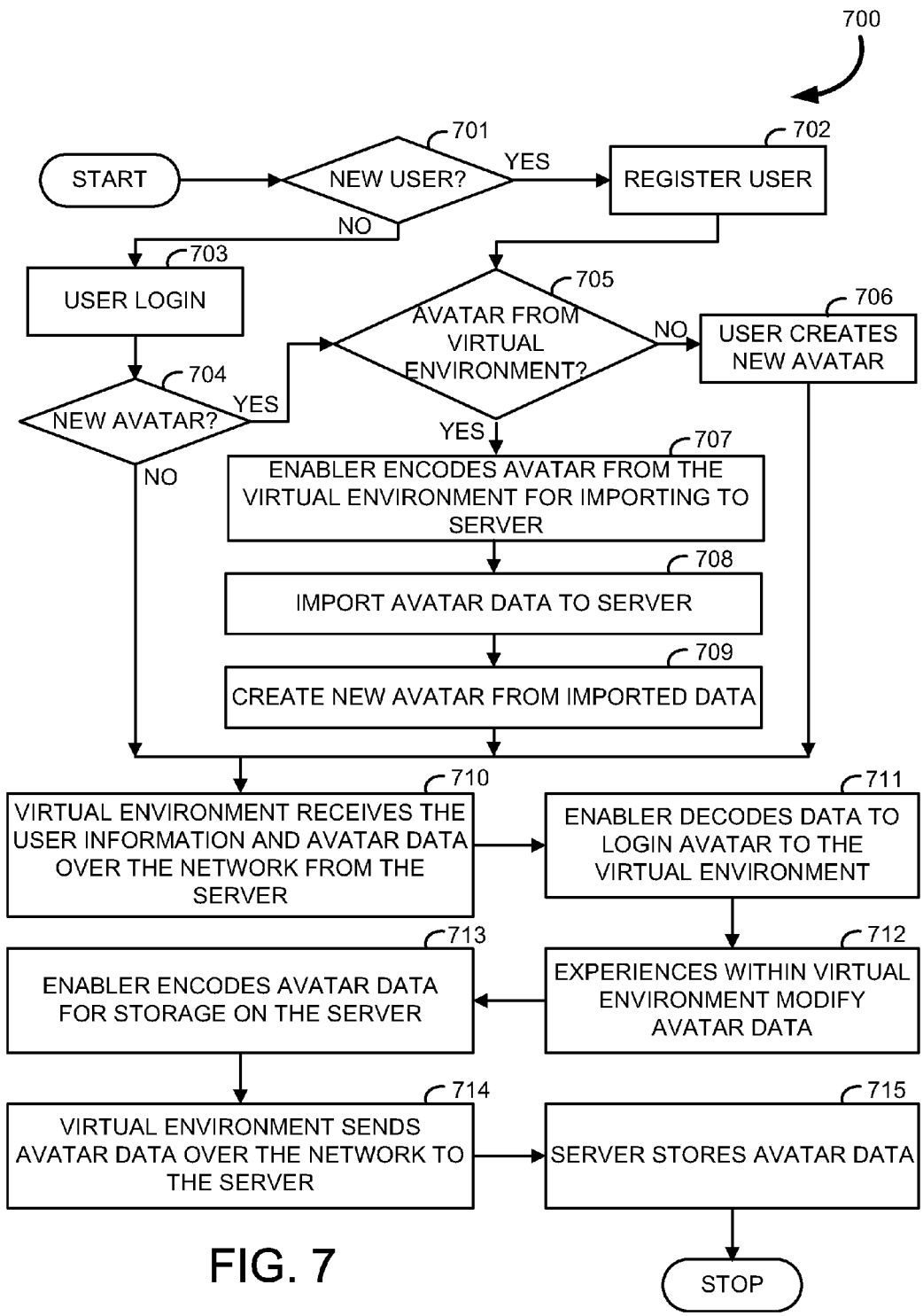
FIG. 7 shows a flow chart illustrating the process for avatar attribute generation for the persistent avatar management system of FIG. 1.

FIG. 7 shows a flow chart illustrating the process 700 for Avatar 221a attribute generation. In some embodiments, attributes may include Physical Attributes 241, Intellectual Attributes 242 and Emotional Attributes 243. In this process a determination is made whether the user is new at step 701. If the user is not new she/he will be required to login at step 703. In some embodiments user credentials may be required to login, typically with a username and password. Of course alternate methods of authenticating user may be utilized as is well known by those skilled in the art. At step 704, a determination is made whether to create a new avatar. If no new avatar is being created the Virtual Environments 211a to 215n receives the user information and data for a preexisting avatar from over the WAN 101 from the Server 121 at step 710. Then proceed to step 711 below.

Otherwise if a new avatar is created then a determination is made whether the Avatar 221a attributes will be from an avatar already in existence in one of the Virtual Environments 211a to 215n, at step 705. If the Avatar 221a is not from a preexisting avatar then the new Avatar 221a will be built from scratch, at step 706. Then, the Virtual Environment 211b receives the user information and data for the newly created Avatar 221a from over the WAN 101 from the Server 121 at step 710. Then proceed to step 711 below.

Else, if the new Avatar 221a is from a preexisting avatar then Enabler 510 encodes the avatar's data from the Virtual Environment 211b for importing to Server 121, at step 707. Then, in step 708, the avatar data is imported to the Server 121. In step 709, the imported avatar data may be used to create the new Avatar 221a. Then, the Virtual Environment 211b receives the user information and data for the newly created Avatar 221a from over the WAN 101 from the Server 121 at step 710. Then proceed to step 711 below.

If in step 701 the user is a new user then the user registers in step 702. Registration may include generating a username and password. Then an Avatar 221a is created. A determination is made whether the new Avatar 221a attributes will be from an avatar already in existence in a Virtual Environment 211b, at step 705. If the new Avatar 221a is not from a preexisting avatar then the new Avatar 221a will be built from scratch, at step 706. Then, the Virtual Environment 211b receives the user information and data for the newly created Avatar 221a from over the WAN 101 from the Server 121 at step 710. Then proceed to step 711 below.

Else, if the new Avatar 221a is from a preexisting avatar then Enabler 510 encodes the avatar data from the Virtual Environment 211b for importing to Server 121, at step 707. Then, in step 708, the avatar data is imported to the Server 121. In step 709, the imported avatar data may be used to create the new Avatar 221a. Then, the Virtual Environment 211b receives the user information and data for the newly created Avatar 221a from over the WAN 101 from the Server 121 at step 710.

At step 711 the Enabler 510 decodes the data and logs the Avatar 221a into the Virtual Environment 211b. The Avatar 221a incurs experiences within the Virtual Environment 211b which may result in changes made to the Avatar 221a. At step 712 the experiences within Virtual Environment 211b modify Avatar 221a data. In step 713 the enabler encodes the Avatar 221a data, including the modifications, for storage on the Server 121. In step 714 the Virtual Environment sends the Avatar 221a to 215n data over the WAN 101 to the Server 121. The Server 121 then stores the Avatar 221a data, thereby incorporating changes made to the Avatar 221a within the Virtual Environment 211b.

Figure 8:
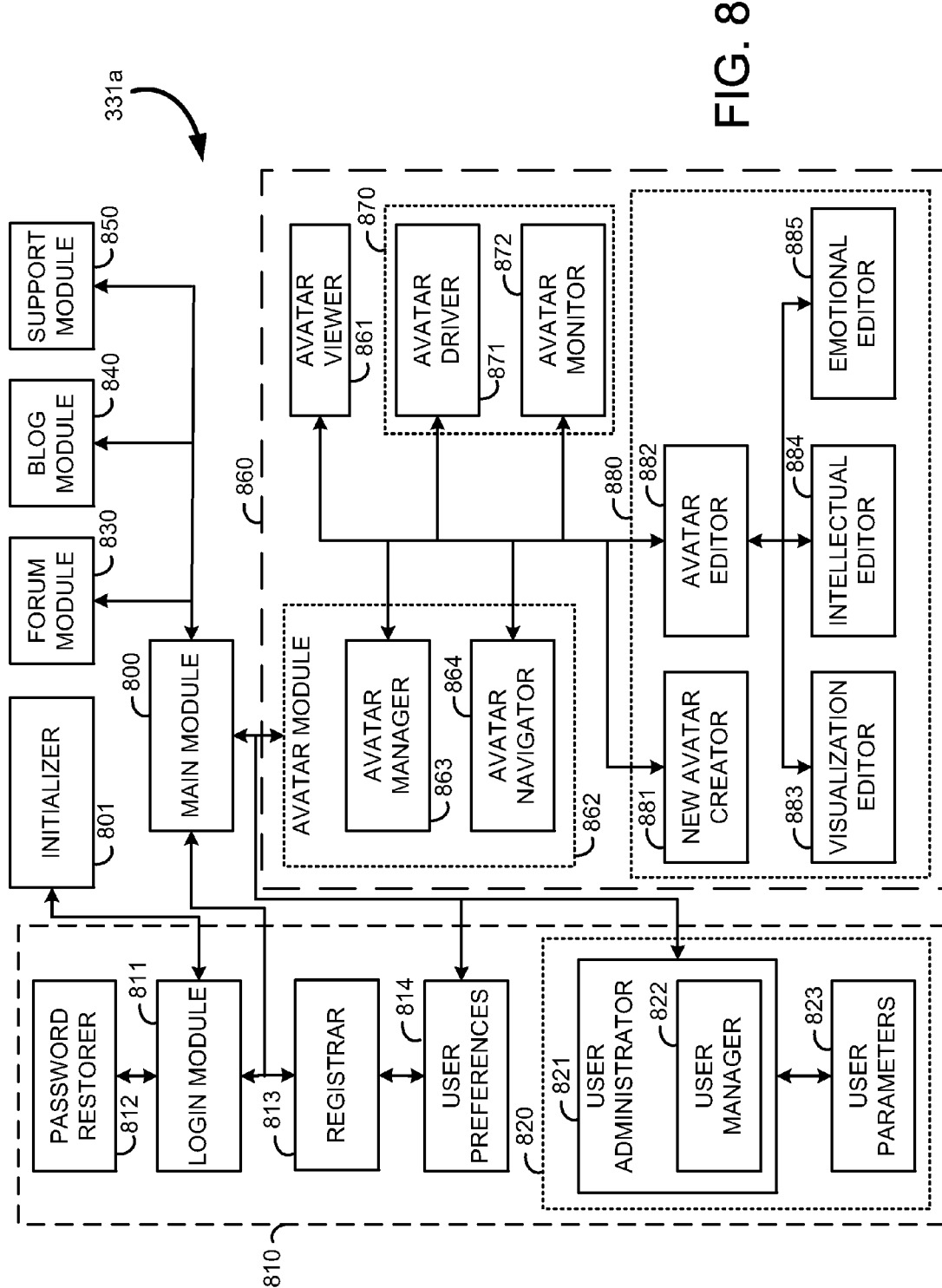
FIG. 8 shows a logical block diagram of a user interface system for the persistent avatar management system of FIG. 1.

FIG. 8 shows a logical block diagram of an exemplary Customer Interface 331a for the persistent avatar management system of FIG. 1. An Initializer 801 is coupled to Login Module 811. Login 811 is included in a User Module 810. User Module 810 includes abilities to Password Restorer 812, Registrar 813, User Preferences 814, and User Director 820. Login 811 is coupled to the Password Restorer 812 and change Registration 813 information and Main Module 800. Registration 813 is coupled with Main 800 and User Preferences 814. Main Module 800 is coupled to Login 811, Registration 813, User Preferences 814, User Director 820, Forum Module 830, Blog Module 840, Support Module 850 and Avatar Development Module 860 via the Avatar Module 862.

The User Director 820 includes a User Administrator 821 which in turn includes User Manager 822, and User Parameters 823. User Parameters 823 is coupled to the User Administration Main 821. The User Director 820 module allows for management of users and the parameters of each user. For instance a particular one of Customers 130 may have multiple users; however, certain Virtual Environments 211a to 215n may be accessible to a subset of the users.

The Forum Module 830 may provide access to forums to enhance communication. The Forum Module 830 may include forum search ability, the ability to view forums and archive forum discussions.

The Blog Module 840 provides a web log history of the Avatar's 221a actions and conversations. The Blog Module 840 may include searching capabilities, viewing capabilities, and the ability to edit or delete the conversational histories of the Avatar 221a.

The Support Module 850 may include the ability to request support, search support inquiries by other users, view resolutions to common problems and troubleshoot.

The Avatar Development Module 860 includes Avatar Module 862, Avatar Viewer 861, Avatar Testing Module 870, and an Avatar Redactor 880. The Avatar Module 862 includes Avatar Manager 863 and Avatar Navigator 864. Avatar Testing Module 870 includes manual Avatar Driver 871 and Avatar Monitor 872. The Avatar Redactor 880 includes an Avatar Creator 881, an Avatar Editor 882, Visualization Editor 883, Intellectual Editor 884 and an Emotional Editor 885. The Avatar Redactor 880 includes the ability to create, edit, copy, review and manage one or more Persistent Avatars 221a to 221t.

The Avatar Module 862 couples with Avatar Viewer 861, manual Avatar Driver 871, Avatar Monitor 872, Avatar Creator 881, and the Avatar Redactor 880 via the Avatar Creator 881 and Avatar Editor 882. The Avatar Editor 882 couples with the Visualization Editor 883, Intellectual Editor 884 and Emotional Editor 885. The layout and structure of the Customer Interface 331a is of course not limited by the embodiments aforementioned. Alternate interface designs may be utilized as desired.

Figure 9:
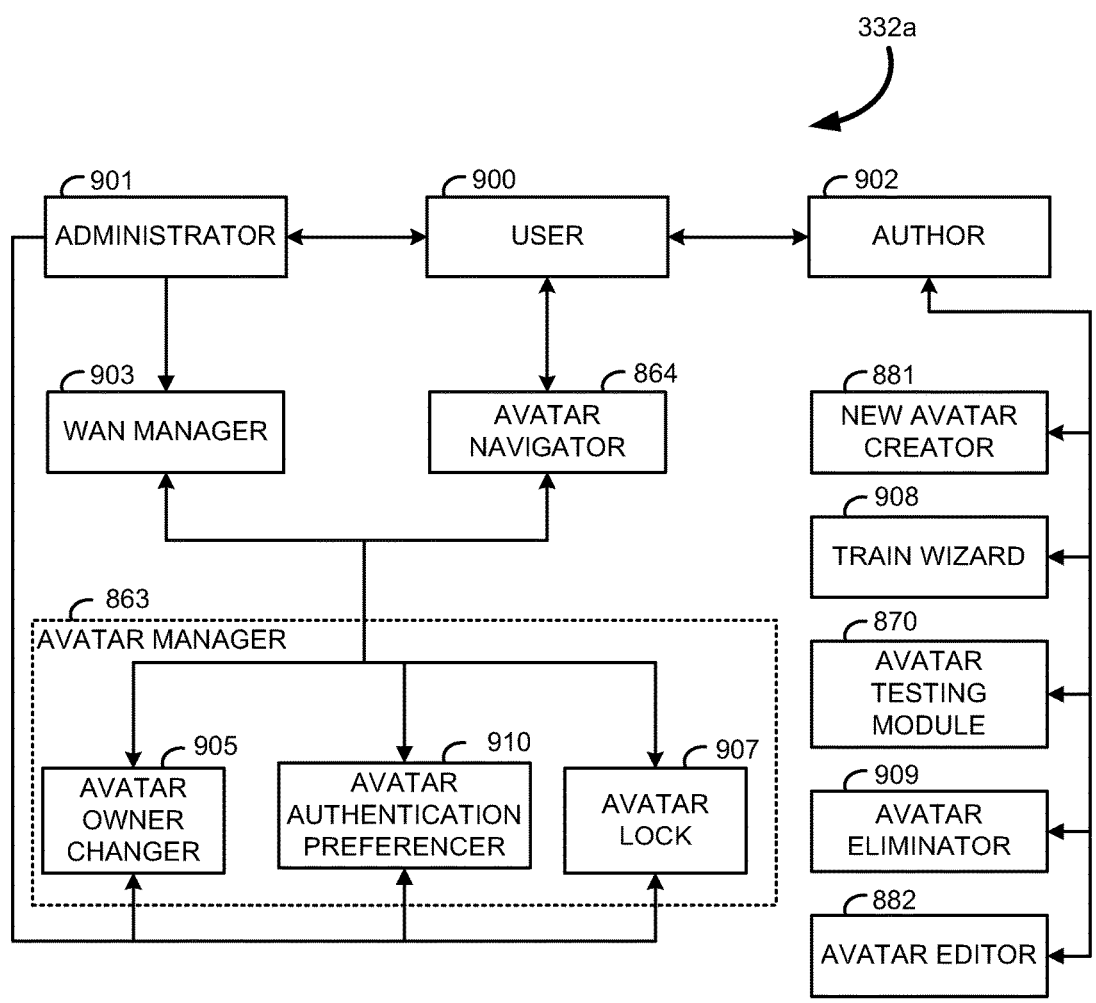
FIG. 9 shows a logical block diagram of author tools for the persistent avatar management system of FIG. 1.

FIG. 9 shows a logical block diagram of an exemplary Author Tools 332a for the persistent avatar management system of FIG. 1. Three user roles exist: Second Users 900 or simply "User", "Common User" or "End Users", Administrators 901 and Authors 902. Second Users 900 are coupled to Avatar Navigator 864. Administrators 901 and Authors 902 may become Users 900. Conversely, under proper conditions a User 900 may become an Administrator 901 or Author 902.

Administrators 901 are power users who may administrate work of main Customer Interface 331a functions. For example Administrators 901 may create arbitrator for forums within the Forum Module 830, and approving of registration new users. Administrators 901 are coupled to WAN Manager 903 and Avatar Manager 863. Avatar Manager 863 includes the ability to Change Avatar's Owner 905, Avatar Authentication Preferencer 910 and Avatar Lock 907. Avatar Manager 863 has direct effects upon Avatar Navigator 864.

Authors 902 are users who are involved in process of Avatar 221a development (narrations writing, Avatar 221a knowledgebase filling, drawing, etc.). Author 902 has access to Blog Module 840 as well. In some embodiments, the Author 902 encapsulates two classes: corporate customer and end-user. There may be a difference between the two for the feature sets enabled in the Avatar Redactor 880. For example corporate customer includes game designer at a companies and would include less breadth of feature sets but more depth. An example of end-user includes an individual with a MySpace account who requires more breadth of feature sets but less depth. Authors 902 have access to New Avatar Creator 881, Avatar Eliminator 909, utilize Train Wizard 908, access Avatar Testing Module 870 and Avatar Editor 882. The Train Wizard 908 may be an advanced feature that utilizes a "wizard", wherein the wizard is a guided set of dialog windows with embedded help, to guide the user through an initial experience of creating rules for the Avatar 221a. In some embodiments, an example of interaction may then be shown in the same window as the rules editor, thereby allowing convenient training. Such a feature may be valuable to less experienced users.

Figure 10:
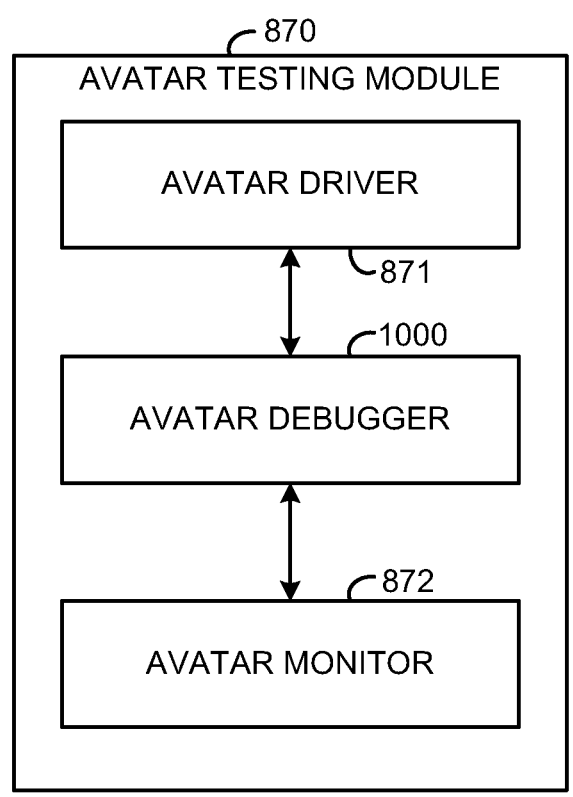
FIG. 10 shows a functional block diagram of an avatar testing module for the persistent avatar management system of FIG. 1.

FIG. 10 shows a functional block diagram of one embodiments of Avatar Testing Module 870 for the persistent avatar management system of FIG. 1. The Avatar Testing Module 870 may include a manual Avatar Driver 871, Avatar Monitor 872, and Avatar Debugger 1000. Avatar Debugger 1000 utilizes information from manual Avatar Driver 871 and Avatar Monitor 872 to debug an Avatar 221a. In some embodiments, debug an Avatar 221a may include monitoring Avatar's 221a reactions, movements, interactions, gestures and expressions for believability. In alternate embodiments, believability may not be the desired end result, in which case the Avatar 221a may be monitored for some alternate behavioral, movement and reactionary criteria. Minor alterations to the Avatar's 221a attributes may then be implemented to ensure greater compliance to the desired behavioral, movement and reactionary criteria.

Figure 11:
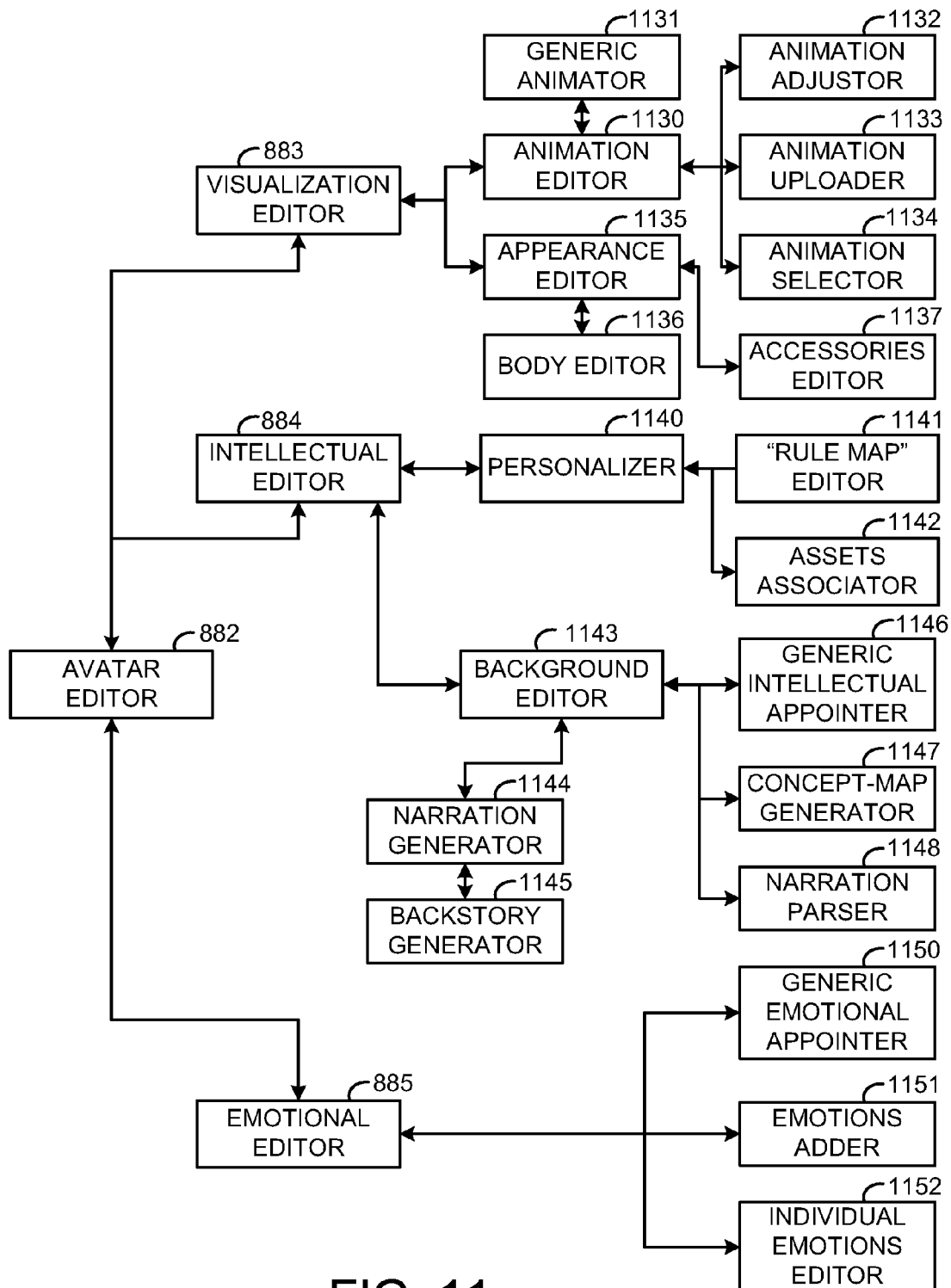
FIG. 11 shows a functional block diagram of an avatar editor for the persistent avatar management system of FIG. 1.

FIG. 11 shows a functional block diagram of the Avatar Editor 882 that is included in the Avatar Redactor 880. Avatar Editor 882 function may be coupled to Visualization Editor 883, Intellectual Editor 884 and Emotional Editor 885. Visualization Editor 883 may be coupled to Animation Editor 1130 and Appearance Editor 1135. Animation Editor 1130 may be coupled to Generic Animator 1131, Animation Adjustor 1132, Animation Up-loader 1133 and Animation Selector 1134. Appearance Editor 1135 may be coupled to Body Editor 1136 and Accessories Editor 1137.

Intellectual Editor 884 may be coupled to Background Editor 1143 and Personalizer 1140. Background Editor 1143 may be coupled to Narration Generator 1144, Generic Intellectual Background Appointer 1146, Concept-Map Generator 1147 and Narration Parser 1148. In some embodiments a concept-map is a graphical representation of a narrative represented by "concepts". Narration Generator 1144 may be coupled to Backstory Generator 1145. Personalizer 1140 may be coupled to "Rule Map" Editor 1141 and Asset Associator 1142. A Rule Map includes an interactive graphic of the rules, how they are connected, which rules are used more often than the others.

Emotional Editor 885 may be coupled to Generic Emotional State Appointer 1150, Emotions Adder 1151 and Individual Emotions Editor 1152. Additional aspects of the Avatar 221*a* may become editable as Avatar 221*a* complexity increases. It is intended that these additional editing functions become incorporated into the Avatar Editor 882. Additionally, in some embodiments it may be advantageous to have fewer editing functions for simplicity or cost versus benefit reasons.

Figure 12:
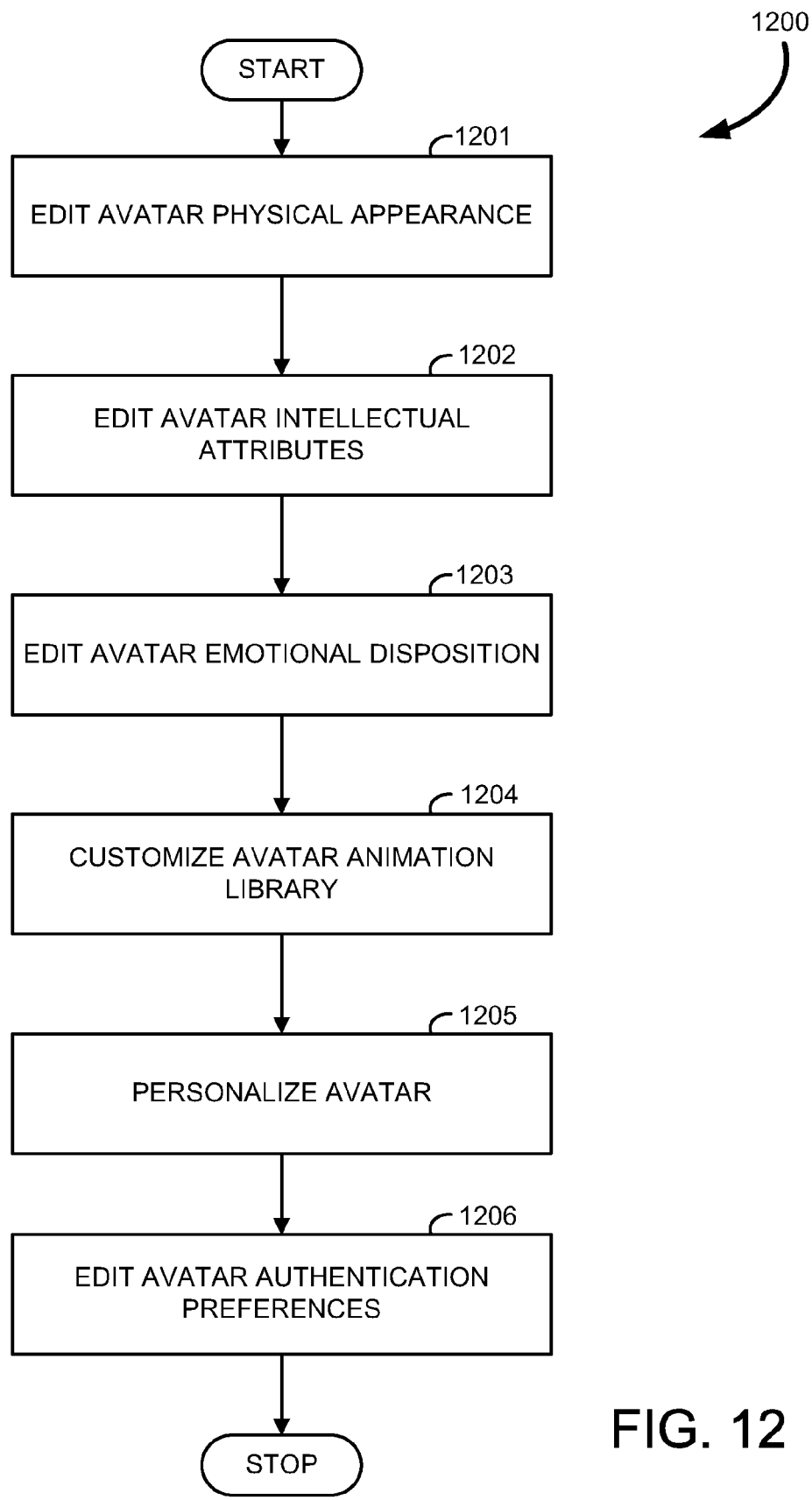
FIG. 12 shows a flow chart illustrating the process for editing an avatar for the persistent avatar management system of FIG. 1.

FIG. 12 shows a flow chart 1200 illustrating the process for editing the Avatar 221*a* for the persistent avatar management system of FIG. 1. In this process, the Avatar's 221*a* appearance is edited at step 1201. Then the Avatar's 221*a* intellectual attributes are edited in step 1202. In step 1203, the Avatar's 221*a* emotional disposition is edited. In step 1204, the Avatar's 221*a* animation library is customized. Then, in step 1205, the Avatar 221*a* is personalized. Lastly, in step 1206, the Avatar 221*a* authentication preferences are customized by utilizing the Avatar Authentication Preferencer 910. The process then concludes.

Figure 13:
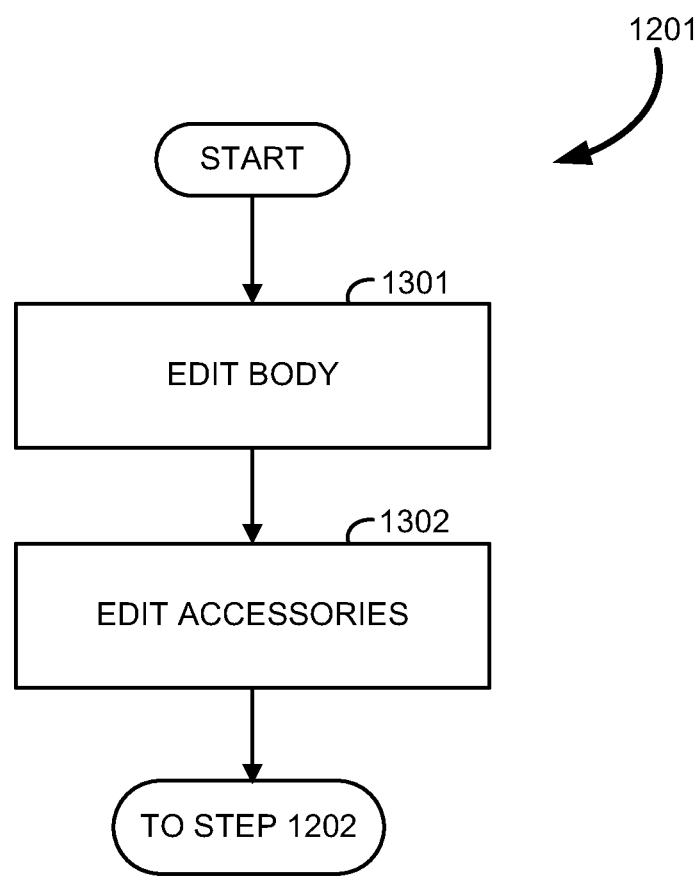
FIG. 13 shows a flow chart illustrating the process for editing the appearance of an avatar for the persistent avatar management system of FIG. 1.

FIG. 13 shows a flow chart 1201 illustrating the process for editing the Avatar's 221*a* appearance within the Avatar Editor 882. In this process the Avatar's 221*a* body is edited at step 1301. Then, in step 1302, the accessories are edited. After completion the process returns to step 1202 of FIG. 12.

There are three primary methods of creating dimensional computer graphics as is well known by those skilled in the art. The first method is to manually input data, either by typing or using a Graphical User Interface (GUI). This is tedious, but precise, and generally looks quite good. The second method is to use 3D scanning technology to enter data which is fast, precise, looks good, but is often quite expensive since it requires a 3D scanner. The third method is the use of algorithms which generate models from pre-existing formula, position sets, or other data that dictates the position of the geometry, then doing some variable on that, or even creating it from the ground up. This method, once built, is extremely fast, precise, and inexpensive, but may result in distribution of potential errors. Accordingly one, all, or a combination of these methods may be utilized to create dimensional computer graphics for use in the process 1201 of editing the Avatar's 221*a* appearance.

In some embodiments, template-sets are built that articulate several 'common' anthropomorphic configurations. This template contains all the features of a numerically average human. The proportions of the nose, arms, posture, and other visual features are built to an average for male, female, and neuter models. This is done for mesomorph, ectomorph, and endomorph body types. This provides nine templates from which to work from. The nine base templates may be edited so that any small adjustments are made to ensure a high quality model of nearly-perfect appearance. The model may be custom-tailored to specific desires of facial or body features. The user may engage in an editing process with one of the nine templates which, when completed, creates a model that very closely approximates the user's desired appearance.

In some embodiments, an alternate production path may be desired. Many gamers and developers will have already built models of Avatars 221*a* to 221*t* that they enjoy, and it is desirous to allow them to use these as they may have an Avatar 221*a* that looks as they want it to. The user may want to imbue the Avatar 221*a* with emotion and intellect.

Polygons may be a default method of 3D representation. However, while polygons may be subdivided and reduced, the presence of edges generally makes calculation that changes visual resolution complicated, if at all workable. Therefore, in some embodiments, the method of representing geometry may be indefinitely detailed as visual resolution is altered, and still be sufficiently light as to be transportable over a WAN 101. Examples of this kind of 3D representation method include Metaballs, and NURBs (Non-uniform rational B-splines).

Figure 14:
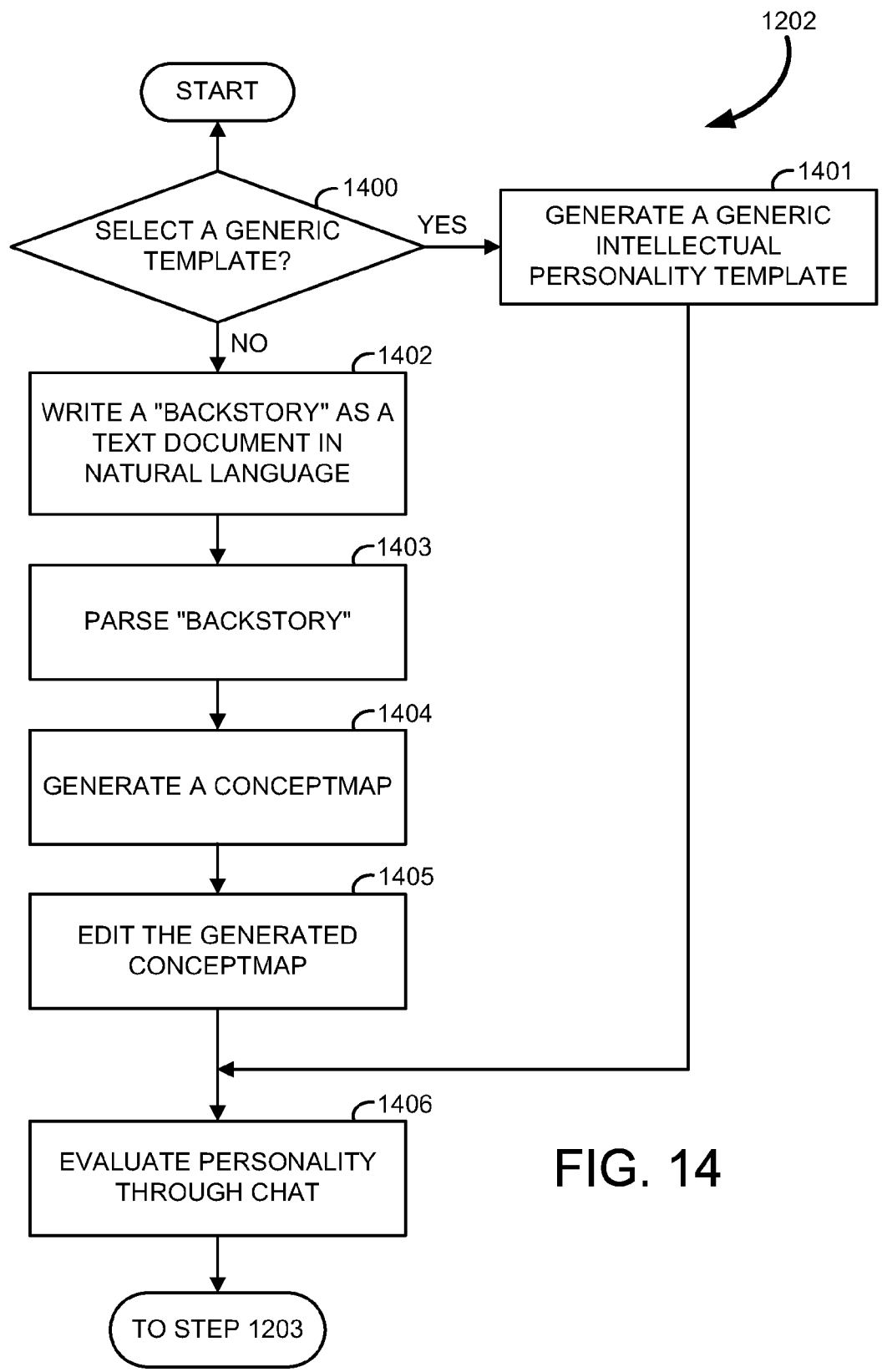
FIG. 14 shows a flow chart illustrating the process for editing the backstory of an avatar for the persistent avatar management system of FIG. 1.

FIG. 14 shows a flow chart 1202 illustrating the process for Editing the Backstory 1145 of an Avatar 221*a* within the Avatar Editor 882. In this process a determination to use a generic template is made in step 1400. If a generic template will be used, a generic intellectual template is generated in step 1401. The personality is then evaluated through chat in step 1406. After completion the process returns to step 1203 of FIG. 12. Else, if a generic template will not be used, a backstory is written in natural language in step 1402. Then, in step 1403, the backstory is parsed into its conceptual elements. These conceptual elements are then organized in a grid concept-map, in step 1404. In step 1405 the concept-map is edited. The personality is then evaluated through chat in step 1406. After completion the process returns to step 1203 of FIG. 12.

Figure 15:
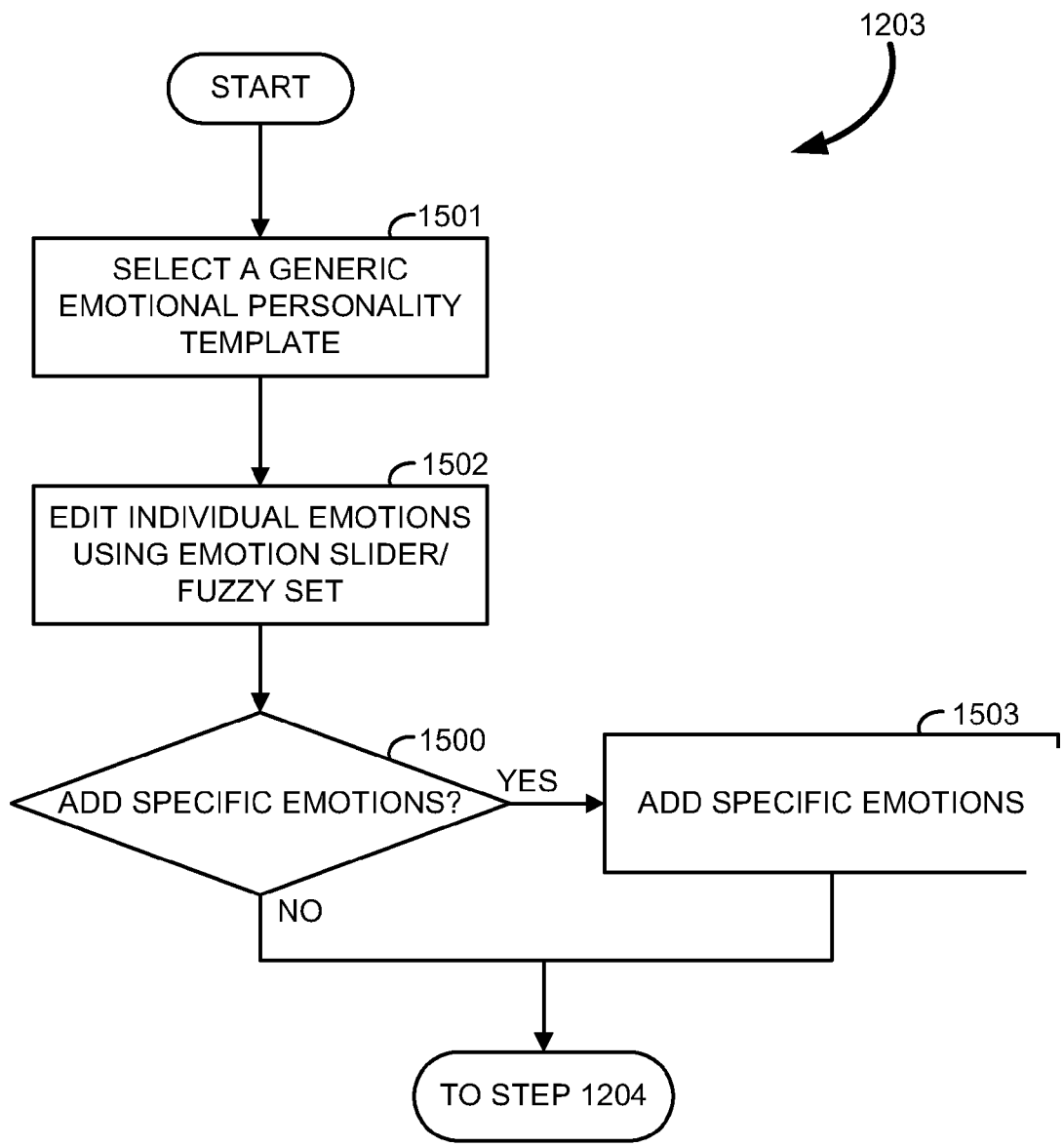
FIG. 15 shows a flow chart illustrating the process for editing the emotional disposition of an avatar for the persistent avatar management system of FIG. 1.

FIG. 15 shows a flow chart 1203 illustrating the process for editing the emotional disposition of an Avatar 221*a* within the Avatar Editor 882. In this process a general emotional personality template is selected in step 1501. Then, in step 1502, individual emotions are edited with a slider and fuzzy set. In step 1500, a determination is made to add specific emotions. Then, if determined so, specific emotions are added in step 1503. After completion the process returns to step 1204 of FIG. 12. Else if no specific emotions are added the process returns to step 1204 of FIG. 12.

Figure 16:
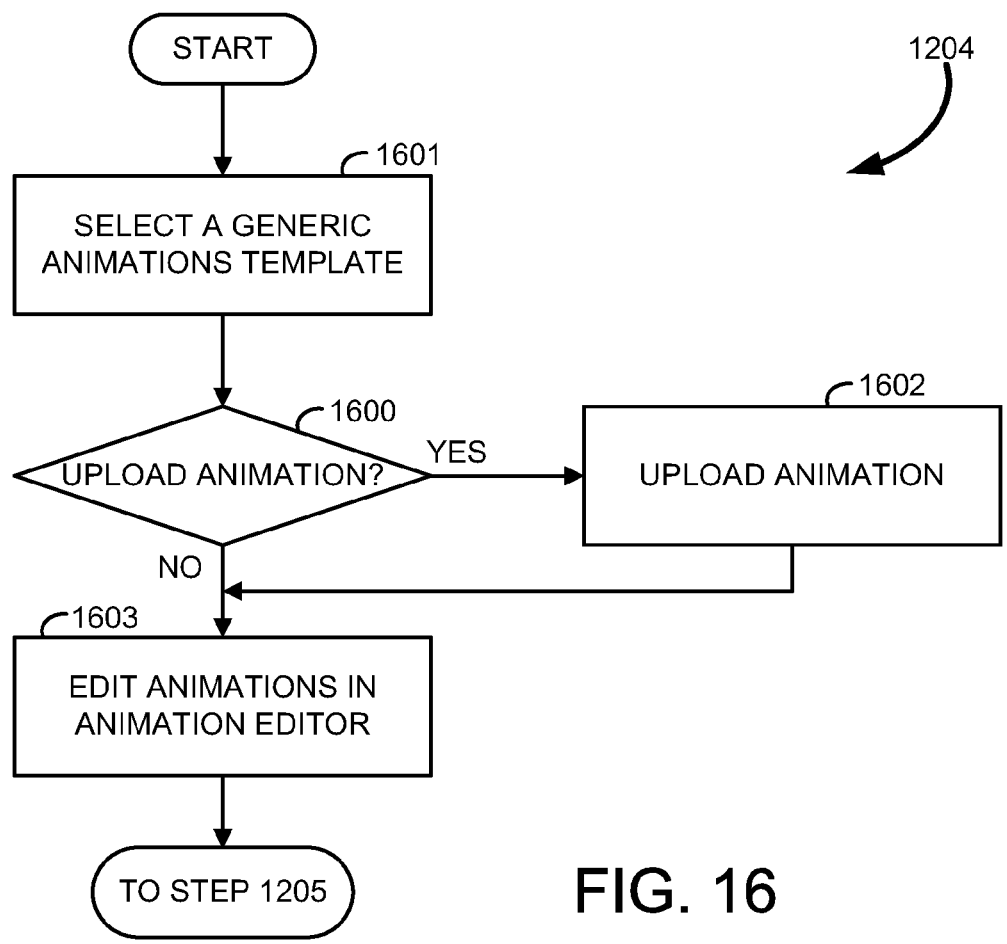
FIG. 16 shows a flow chart illustrating the process for editing the animation of an avatar for the persistent avatar management system of FIG. 1.

FIG. 16 shows a flow chart 1204 illustrating the process for editing the animation of an Avatar 221*a* within the Avatar Editor 882. In this process a generic animation template is selected in step 1601. In step 1600, a determination is made whether to upload animation. Then, if determined so, animation may be uploaded in step 1602. In step 1603, animations are edited within the animation editor. After completion the process returns to step 1205 of FIG. 12. Else if no animations are uploaded, animations are edited within the animation editor in step 1603. After completion the process returns to step 1205 of FIG. 12.

Figure 17:
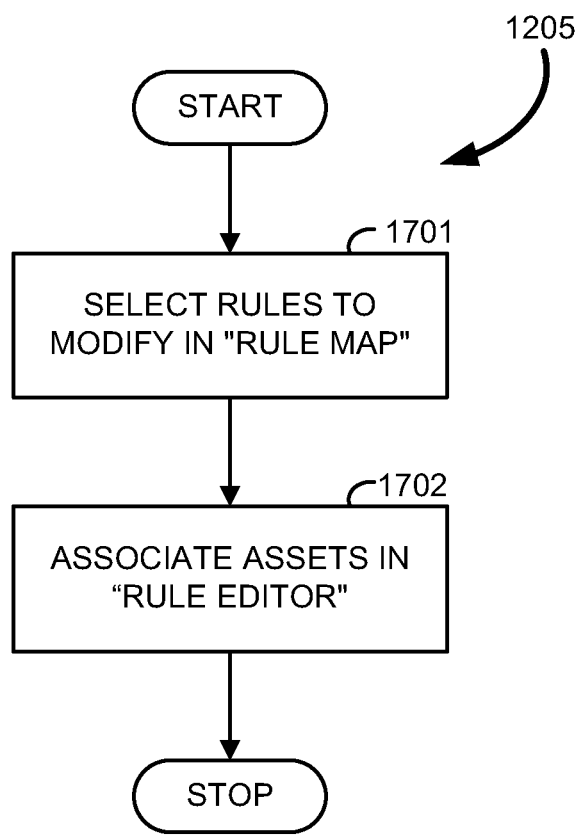
FIG. 17 shows a flow chart illustrating the process for editing the personality rules of an avatar for the persistent avatar management system of FIG. 1.

FIG. 17 shows a flow chart 1205 illustrating the process for editing the personality rules of an Avatar 221*a* within the Avatar Editor 882. In this process rules within the Rule Map to be modified are selected in step 1701. Then, in step 1702, assets are associated within the rule editor.

Figure 18:
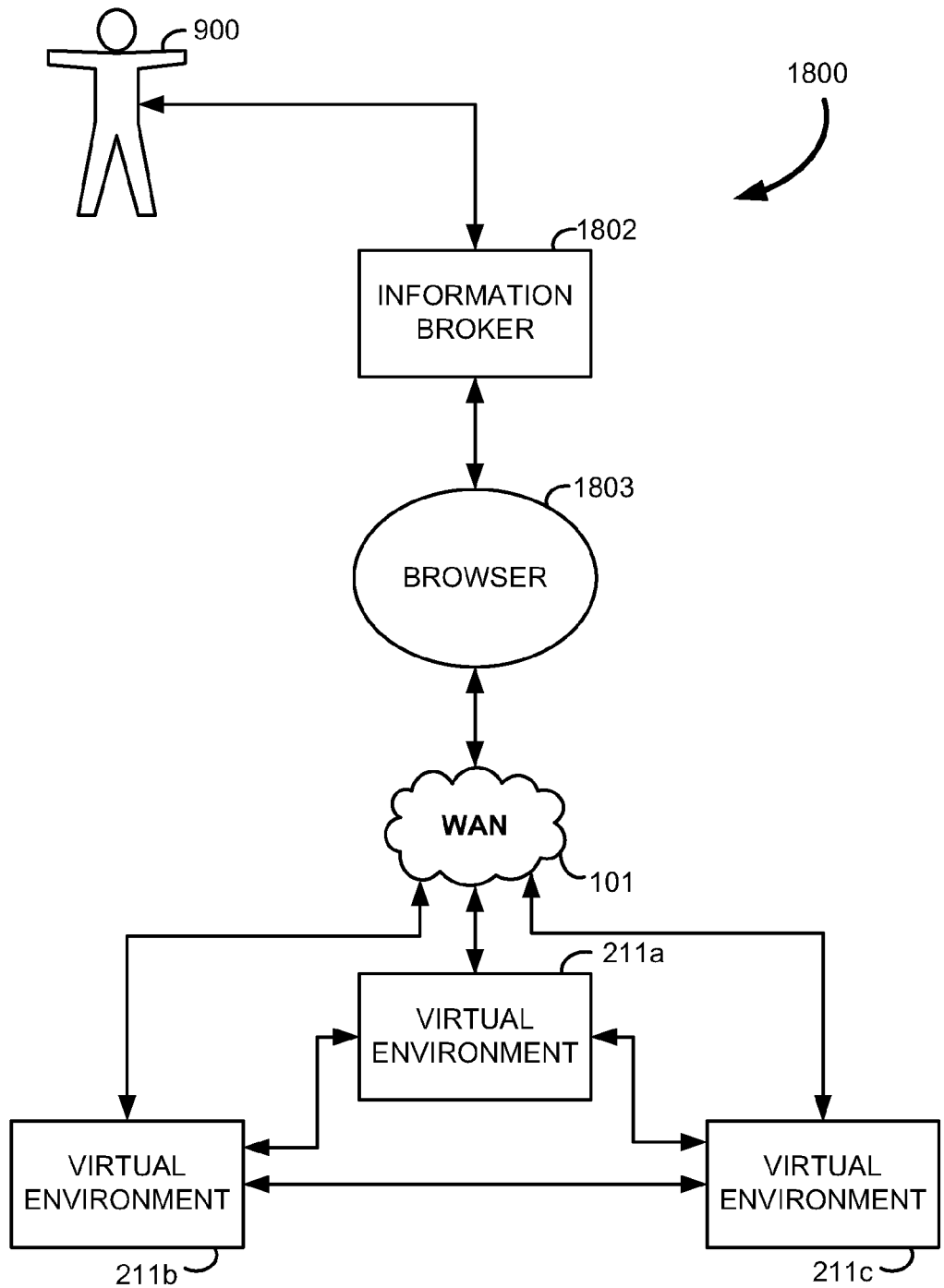
FIG. 18 shows a logical block diagram of user interactions with an information broker in accordance with an embodiment of the present invention.

FIG. 18 shows a logical block diagram 1800 of User 900 interactions with an Information Broker 1802 in accordance with an embodiment of the present invention. In some embodiments, the Information Broker 1802 is a variety of Persistent Avatar 221*a* that acts as a personal assistant to broker trust and personal information as the User 900 navigates through multiple Virtual Environments 211*a* to 211*c* with a separate Persistent Avatar 221*a*. Multiple Virtual Environments 211*a* to 211*c* may include any number of additional Virtual Environments 211*a* to 215*n*. Alternatively, in some embodiments the Information Broker 1802 may be a component of the Persistent Avatar 221*a* User 900 is navigating the Virtual Environments 211*a* to 214*c* with. In some embodiments the Information Broker 1802 may have no physical representation, and the User 900 may not realize when the Information Broker 1802 is active. Alternatively, the Information Broker 1802 may be a more tangible aspect of the User's 900 virtual exploration.

The User 900 accesses Virtual Environments 211a to 211c through the Information Broker 1802, a browser 1803 and the WAN 101. In some embodiments, some or all of the Virtual Environments 211a to 211c require personal information about the User 900 to provide access or full functionality. Thus, every time the User's 900 Avatar 221a migrates from one Virtual Environment 211a to 211c to another the User 900 is prompted to provide information before the migration may be completed. This repetitive prompting may seriously disrupt User's 900 migration from one Virtual Environment 211a to 211c to another. The Information Broker 1802 makes decisions based upon trust levels for each Virtual Environment 211a to 211c and brokers personal information accordingly in order to make migration more seamless, yet still maintain a high level of security with personal information.

Figure 19:
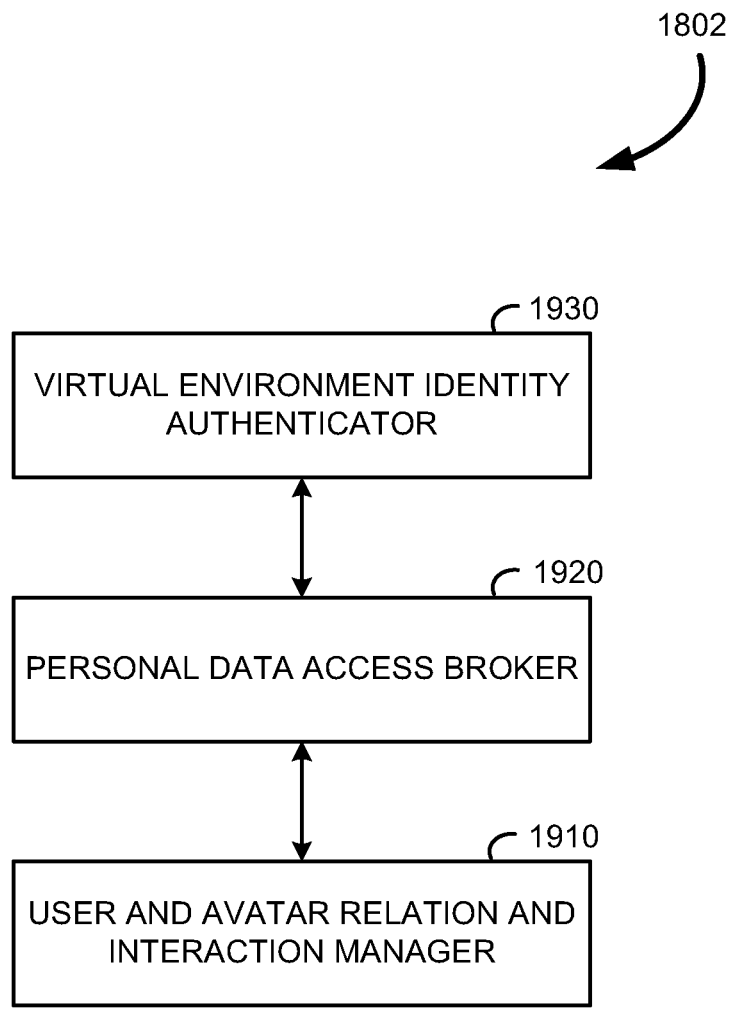
FIG. 19 shows a logical block diagram of the information brokering in accordance with an embodiment of the present invention.

FIG. 19 shows a logical block diagram of the Information Broker 1802 of FIG. 18. Personal Data Access Broker 1920 includes Virtual Environment Identity Authenticator 1930 and User and Avatar Relationship Manager 1910. Virtual Environment Identity Authenticator 1930 is very important since the level of trust provided any particular Virtual Environment 211b is entirely dependent upon that Virtual Environment's 211a to 215n identity. Subsequently, accurate data is imperative to secure Brokering of Access to Personal Information 1920. The User and Avatar Relationship Manager 1910 provides the User's 900 comfort level, preferences, trust and habits. The trustworthiness of a Virtual Environment 211b is then balanced by the User's 900 trust to determine the extent of information access.

Figure 20:
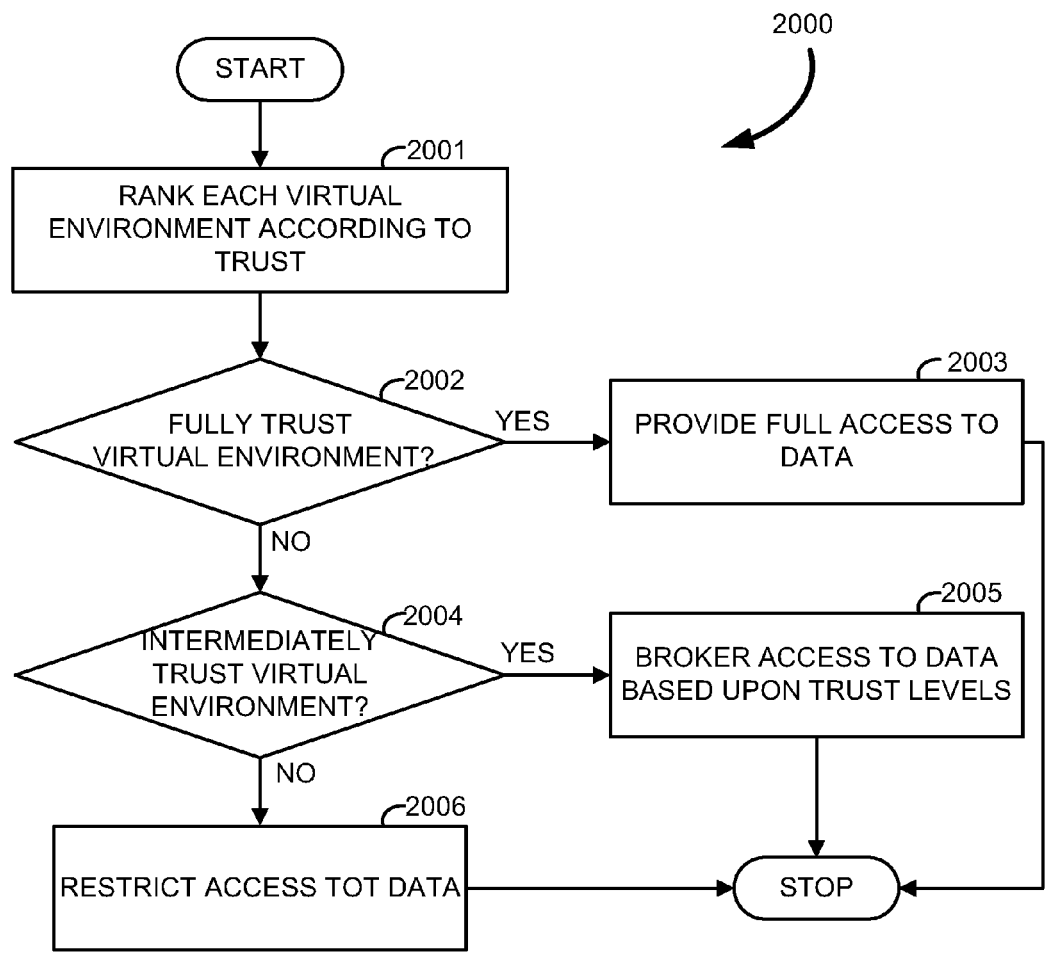
FIG. 20 shows a flow chart illustrating the process for user information brokering for the information broker of FIG. 18.

FIG. 20 shows a flow chart 2020 illustrating the process for Personal Information Access Broker 1920 for the Information Broker 1802 of FIG. 18. In this process the Virtual Environment 211b is ranked by trust in step 2021. In some embodiments, this ranking by trust takes into account the identity of the Virtual Environment 211b, the User's 900 previous trust for the particular Virtual Environment 211b or similar Virtual Environments 211a to 215n, public knowledge of the trustworthiness of the Virtual Environment 211b, and the User's 900 natural trust levels. In some embodiments, additional statistical and preferential information may be utilized in order to determine a trust ranking. In step 2022, a determination is made if the Virtual Environment 211b is fully trusted. If the Virtual Environment 211b is fully trusted the Information Broker 1802 provides full access to the User's 900 available personal information in step 2023.

Else if the Virtual Environment 211b is not fully trusted, a determination is made if the Virtual Environment 211b is intermediately trusted in step 2024. If the Virtual Environment 211b is intermediately trusted, the Information Broker 1802 may provide a limited access to personal information in step 2025. Limited access may be regulated by comparing the level of trust in the Virtual Environment 211b, as determined in step 2021, compared to the sensitivity of the personal information. Alternatively, the User's 900 preferences may augment, or supplant, the sensitivity of the personal information for purposes of regulating limited access to personal information.

Else, if the Virtual Environment 211b is not intermediately trusted, the Information Broker 1802 may restrict access to personal information in step 2026.

Figure 21:
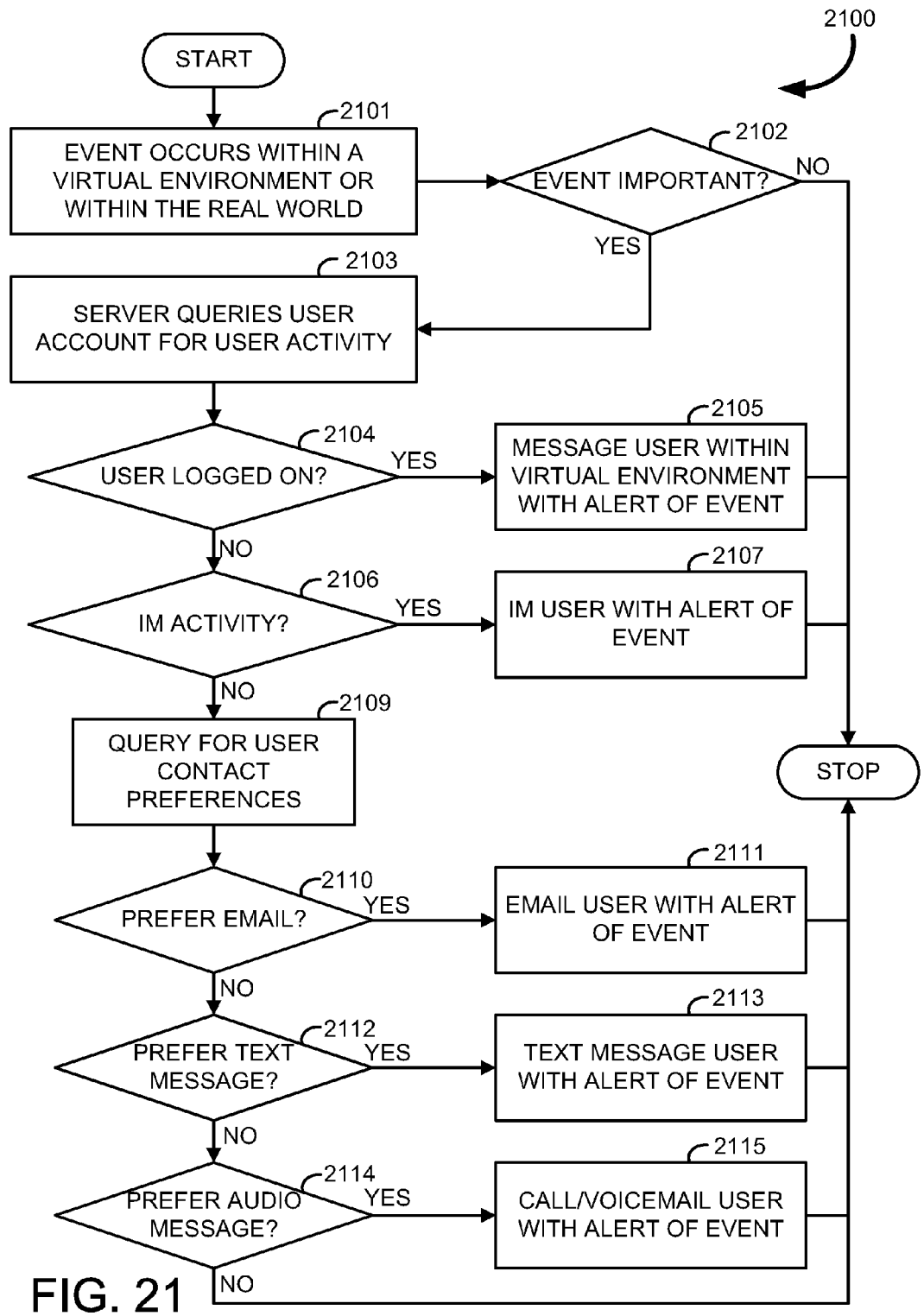
FIG. 21 shows a flow chart illustrating the process for event notification in accordance with an embodiment of the present invention.

FIG. 21 shows a flow chart illustrating the process for Event Notification 2100 in accordance with an embodiments of the present invention. In this process an event occurs within a Virtual Environment 211b or within the Real World in step 1201. Examples of an event may include a response to a forum comment, a guild raid in a MMOG 203, a swing in the New York Stock Exchange, or any other event. Events are monitored for within Virtual Environments 211a to 215n and WAN APIs 170a, 170b to 170r. In step 1202, a determination is made as to whether the event is important. This determination relies heavily on the User 900 preferences stored within the User Account 424 Importance may be determined by an assessor, which assesses the scope, and duration, of an event to the User 900 or the User's Avatar 221a. The User's 900 preferences, degree of impact on User 900, scope of event, duration of event, and degree of impact on User's 900 social network, group associations, interests, physical location, and demographic data may all be utilized by the assessor to determine importance. Additionally, by incorporating a feedback system the assessor may be adaptable to the Users' desires through statistical means. In some embodiments a value may be generated for the importance of an event and the value may be compared to a threshold to determine if an event is important. If the event is found unimportant then the process ends.

Else, if the event is found important then, in step 2103, the User Account 424 is queried for User 900 activity. In step 2104, a determination is made if the User 900 is logged in. If User 900 is logged in then a message may be sent to the User 900 within the Virtual Environment 211b with an alert of the event, in step 2105.

Else, if the user is not logged in a determination is made if the User 900 is engaging in instant messaging, in step 1206. If User 900 is engaging in instant messaging then an instant message may be sent to the User 900 with an alert of the event, in step 2107.

Else, if the User 900 is not engaging in instant messaging, a query may be made into the User's 900 contact preference at step 2109. In step 2110, a determination is made if the preferred contact method is email. If email is the preferred contact method then an email of the event alert may be sent to User 900 at step 2111.

Else, if email is not the preferred contact method then, at step 2112, a determination is made if the preferred contact method is text messaging. If text messaging is the preferred contact method then a text message of the event alert may be sent to User 900 at step 2113.

Else, if text message is not the preferred contact method then, at step 2114, a determination is made if the preferred contact method is an audio messaging. If audio messaging is the preferred contact method then an audio message of the event alert may be sent to User 900 by phone or voicemail, at step 2115.

Else, if audio message is not the preferred contact method then additional methods of User 900 contact may be included, or the process may end. Alternatively, in some embodiments a default message system, such as email, may be utilized if a User 900 is found to have no contact preference.

Figure 22A:
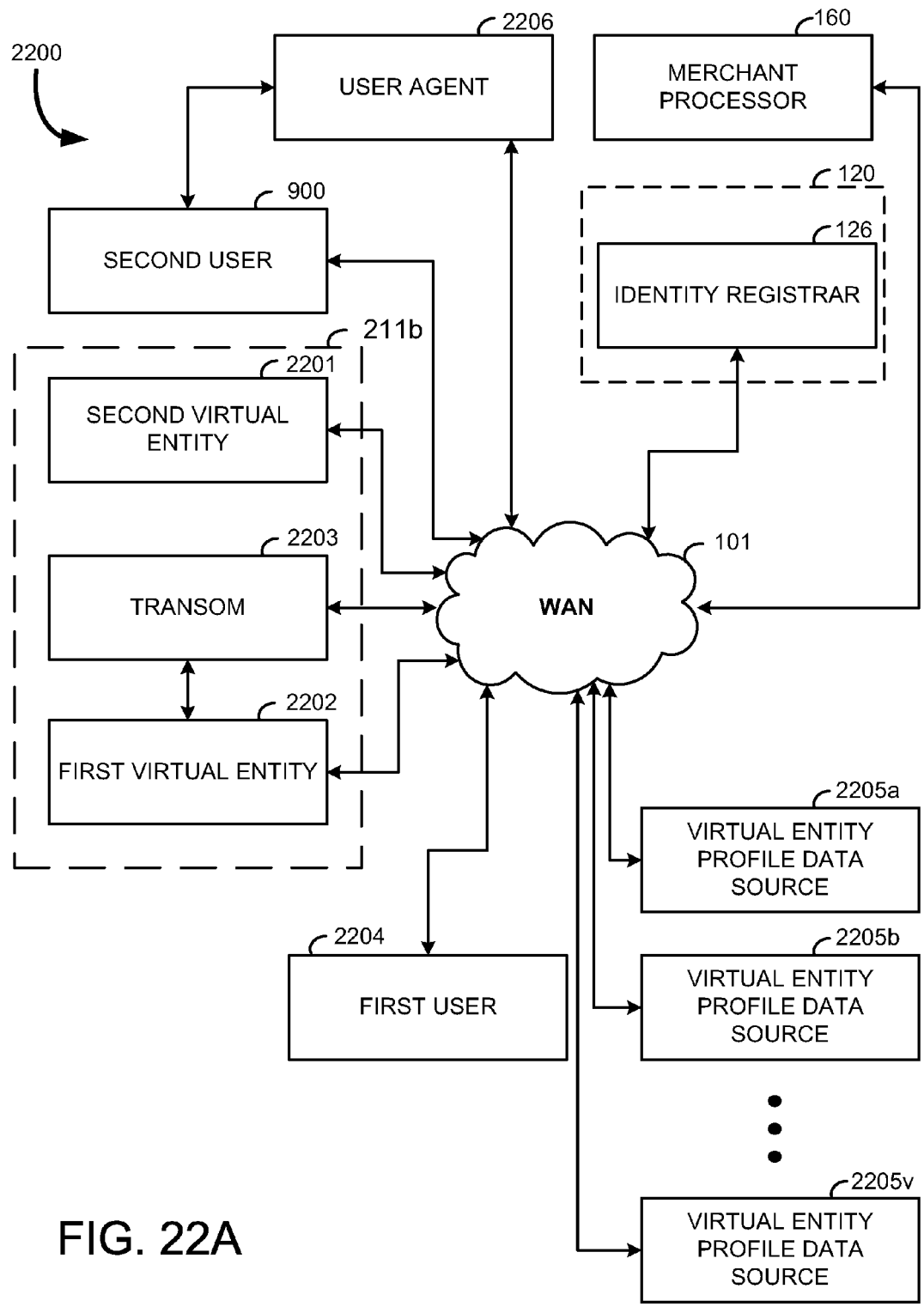
FIG. 22A shows a schematic block diagram illustrating an avatar authentication system in accordance with an embodiments of the present invention.

FIG. 22A shows a schematic block diagram illustrating an Avatar Authentication System 2200 in accordance with the present invention. While this system is disclosed dominantly for the purpose of Avatar 221a to 221t identification, it is intended for the disclosed invention to be a system for authenticating any Second Virtual Entity 2201. Virtual Entities 2201 include avatars, player characters, non-player characters, quasi-player characters, automatons, robots or any additional virtual entities as is well known to those skilled in the art. In some embodiments, a challenge-response system may be utilized in order to process the authentication. The challenge-response system takes place between three relevant parties Second User, or User 900, First User 2204 and Identity Registrar 126. Challenge-response authentication is a family of protocols in which one party presents a question, or challenge, and another party must provide a valid answer, or response, to be authenticated.

The Authentication System 2200 allows for numerous advantages over a non-, or minimalist, identity environment. For instance Second User 900 identification, regardless of Virtual Environment 211*b*, allows for non-player characters to maintain a persistent memory of the Second User 900 across multiple Virtual Environments 221*b*; even when there have been changes in the Second User's 900 Second Virtual Entity 2201. This feature allows for more cohesion between Virtual Environments 211*b*, and for more believable non-player characters.

Additionally, identity and reputation information allows for heightened security and reduced risks when dealing with access issues and financial transactions. This security lends a sense of "trust" to e-commerce, which is currently lacking. Reputation information is vetted by the Identity Provider 126 from a plurality of Virtual Entity Profile Data Sources 2205*a*, 2205*b* to 2250*v*. These data sources provide a wealth of information including credit reports, aliases, commerce reputation, social reputation, assets, access history, etc.

Moreover, identity may enable secure communications between Second User 900 who are located in different Virtual Environments 211*b*. Again, this feature allows for more cohesion between Virtual Environments 211*b*, and is more rewarding, and provides utility, to the Second End User 900.

Furthermore, reliable identity has strong repercussions for parental control and limiting the exposure of mature material to minors. Such screening for appropriateness, and gate keeping functions, may be utilized to protect business models and ward off litigation. For example, such a system used in conjunction with a minor only chat room may eliminate older individuals from masquerading as a minor within the chat room. Such a system provides security to the legitimate user of the chat room, and shields from liability associated with improper conduct on one's site. Another example is in the context of online dating. Individuals place themselves at a real risk when engaging in online dating or social networking. By verifying the identity of users, and vetting their reputation, much of the risk inherent to online dating may be eliminated. These, and further application of the Authentication System 2200 will be discussed in greater detail below.

A Transom 2203, for the purposes of this invention is a program or hardware capable of communication and registration with the Identity Registrar 126. The Transom 2203, First Virtual Entity 2202 and Second Virtual Entity 2201 all exist within the exemplary Virtual Environment 211*b*. The Transom 2203, First Virtual Entity 2202 Second Virtual Entity 2201, First User 2204, Second User 900, Identity Registrar 126, Merchant Processor 160, User Agent 2206, and Virtual Entity Data Sources 220Sa, 220Sb to 220Sv are all coupled to the WAN 101. The WAN 101 enables connectivity of the components of the Authentication System 2200.

The First User 2204 is the party gaining identity information on the Second User 900. First User 2204 owns a First Virtual Entity 2202 within an exemplary Virtual Environment 211*b*. The First Virtual Entity 2202 may include an avatar, establishment, store, automated shop keeper, gate keeper, access point, chat room, dating service, virtual club or any additional virtual entity. Often the First Virtual Entity 2202 will include a business or service, however anyone who desires identity and reputation information may be the First Virtual Entity 2202. For example, an individual may be a First User 2204 who owns an avatar which is the First Virtual Entity 2202. This individual may wish to associate with particular types of people, and thus desires reputation information from other virtual entities.

Within at least one of the Virtual Environments 211*b* that the First Virtual Entity 2202 exists in, the First User 2204 may own a "Transom" 2203. As stated above, the Transom 2203, for the purposes of this invention is a program or hardware capable of communication and registration with the Identity Registrar 126. In some embodiments, the Transom 2203 registration may include a unique identifier. Additionally, in some embodiments, each Transom 2203 may be enabled to only run at one "location" within each Virtual Environments 211*b*. Since many Virtual Environments 211*b* include mapped based metaphors, the location may then depend upon a virtual form of geolocation. Geolocation is the real-world geographic location of an internet connected computer, mobile device, or website visitor based on the Internet Protocol (IP) address, MAC address, hardware embedded article/production number, embedded software number or other information. As such, virtual geolocation would then be the virtual-world "geographic" location of the particular Transom 2203.

Within Virtual Environments 211*b* that do not rely upon map based metaphors, transoms may, in some embodiments, may be indexed by a matrices designating position within a data structure hierarchy. Alternatively, in some embodiments, the unique identifier, in conjunction with the particular Virtual Environment 221*b* may be utilized without a specific "location" element. This allows for mobile Transom 2203, or for a Transom 2203 that may exist in a non map based Virtual Environments 221*b*. It should be noted that currently there are very few non-map based Virtual Environments 221*b* due to the intuitive nature of map metaphors, and the added functionality that these map metaphors add to the Virtual Environments 221*b*.

In some embodiments, the Transom 2203 may appear as an object within the Virtual Environment 221*b*. Such graphical transoms may provide visual cues as to the security of the local, as well as to the state of authentication of any nearby Avatars 221*a* to 221*t* or any virtual entity.

The Second User 900 is a person who asserts her identity within at least one Virtual Environment 221*b* via the actions of her Second Virtual Entity 2201. The User 900 may be required to register with the Identity Provider 126 prior to authentication. End User 900 may utilize a User Agent 2201 in order to access the Identity Provider 126 and Relying Party 2202 through the Transom 2203. The Second Virtual Entity 2201 often includes an Avatar 221*a* to 221*t*, or any other virtual entity.

In some embodiments Identity Registrar 126 may exist within the NOC 120. Alternatively, Identity Registrar 126 may, in some embodiments, be distributed within each of the Virtual Environments 211*b*, and may connect back to some central database for Second Virtual Entity 2201 profiles.

The Second User 900 may be required to register with the Identity Registrar 126 prior to authentication. Second User 900 may utilize a User Agent 2206 in order to access the Identity Registrar 126. In some embodiments, the User Agent 2206 may be a program such as a web browser. Additionally, in some embodiments, User Agent 2206 may be incorporated into the Customer Interface 331a to 331p. Second User 900 may utilize her Second Virtual Entity 2201 to interact with the First User 2204 through the Transom 2203 and the First Virtual Entity 2202. In some embodiments, the Second User 900 may be enabled to communicate directly with the First User 2204 and the Transom 2203.

The First User's 2204 Transom 2203 in conjunction with Second Virtual Entity 2201 and Identity Registrar 126 form a shared secret. A shared secret is any method for distributing a secret amongst a group of participants, here three participants, each of which is allocated a share of the secret. The secret can only be reconstructed when the shares are combined together; individual shares are of no use on their own.

The Identity Registrar 126 may, in some embodiments, utilize the Merchant Processor 160 in order to provide automated payments and fee charging to a particular Second User 900 account. For example, the Identity Registrar 126 may provide identity to the First User 2204 in order to confirm the Second User 900 is able to have access to a particular portion of the Virtual Environment 211b (i.e. virtual white-listing). Then, if the Second User 900 chooses to gain access to the particular portion of the Virtual Environment 211b via her Second Virtual Entity 2201, the Second User's 900 account may be automatically billed through the Merchant Processor 160. Before such a transaction the Second User 900 may be notified that proceeding will cause in the incursion of charges. Such a system may be useful for virtual clubs and other establishments, where only specific Second Users 900 may be granted access and fees are associated with the access.

Identity Registrar 126 may access the First User 2204 through the Transom 2203, which, as discussed above, has been registered with Identity Registrar 126 with a unique identifier. The Identity Registrar 126 may access Second User 900 through the User Agent 2206. Additionally, in some embodiments, Identity Registrar 126 may access Virtual Entity-Profile Data Sources 2205a, 2205b to 2205v in order to create a searchable "virtual entity gallery". In some embodiments, the virtual entity gallery may be a web-based search engine mashup which allows the public to search through avatar, or virtual entity, profile listings. Mashup is a website or application that combines content from more than one source into an integrated experience.

The virtual entity profile listings may, in some embodiments, include microformats which may provide ownership of the Avatar 221a to 221t, or Second Virtual Entity 2201, and its profile data to be claimed by its Author 902 through third-party verification, online reputation of the Second User 900 to be reported by a third party, licensing of the Avatar 221a to 221t, or Second Virtual Entity 2201, and its profile data to be specified by a third-party authority, standard address/email/chat info to be downloaded, or any additional desired functionality. Microformats are mark-up that allow expression of semantics in HTML, or XHTML, web pages; and as such, programs can extract meaning from a web page that is marked up with microformats. Additionally, in some embodiments the avatar gallery may update the Identity Registrar 126 with authentication information as it becomes available.

In some embodiments, the avatar gallery may enable searches of the Second User 900 of a Second Virtual Entity 2201. The searches may compile a one to many mapping of all of Second User's 900 Second Virtual Entities 2201. Such a search may, for example, be used to compile the Second User's 900 reputation. Also, in some embodiments, searches may be preformed on a specific Second Virtual Entity 2201 profile, or virtual entity profile. The specific searches may ignore the other Second Virtual Entity belonging to Second User 900. This has advantages, since often a Second User 900 will have distinct personalities for each Second Virtual Entity 2201 utilized by Second User 900. For example, certain behaviors, such as honoring ones word, may vary greatly between Second Virtual Entities 2201 of the same Second User 900. If this form of behavior is pertinent to the search, the behavioral history of the Second Virtual Entity 2201 may be of more interest than a broader search of Second User 900 behaviors.

Figure 22B:
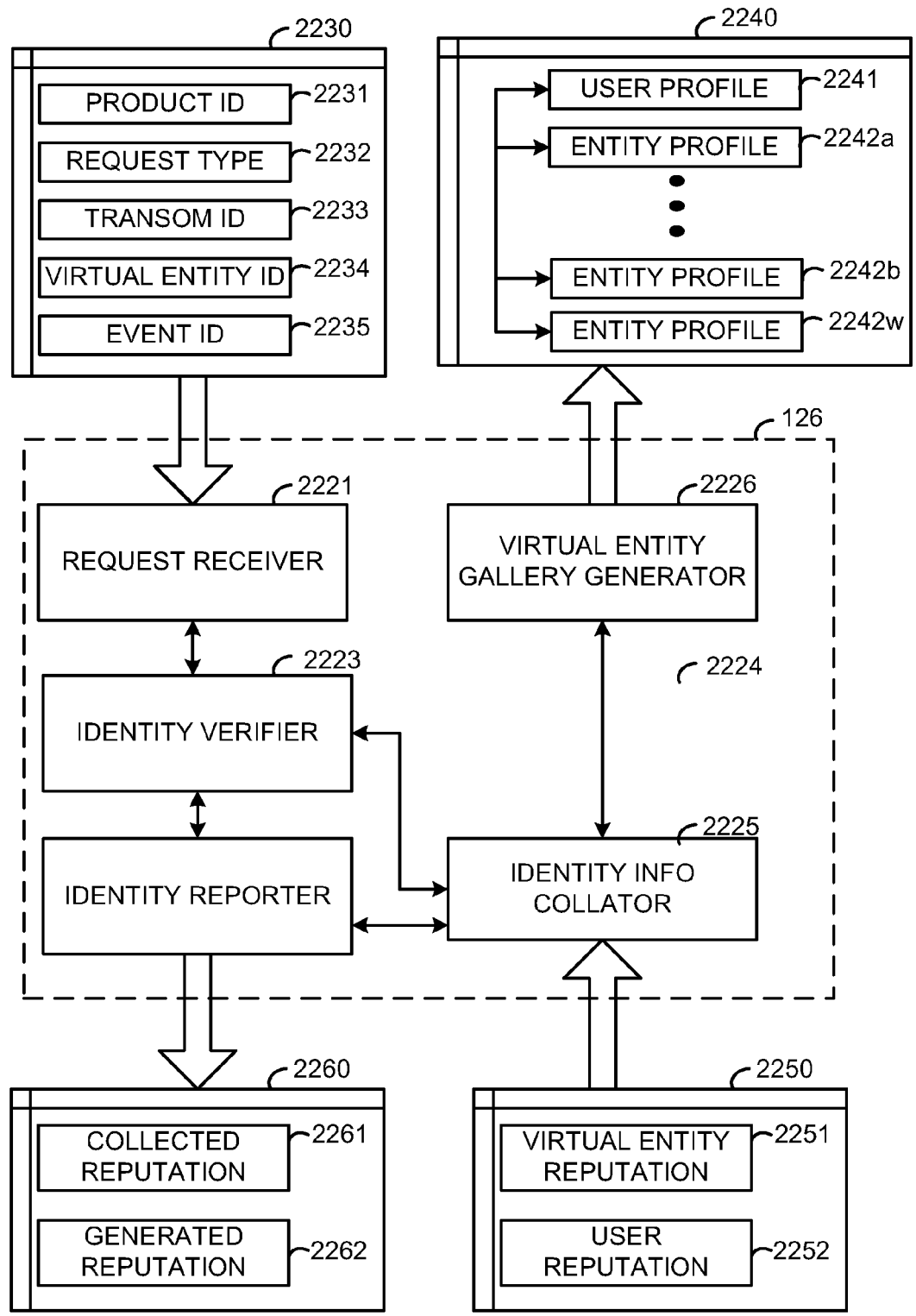
FIG. 22B shows a functional block diagram illustrating an identity registrar for the avatar authentication system of FIG. 22A.

FIG. 22B shows a functional block diagram illustrating the Identity Registrar 126. The Identity Registrar 126 includes a Request Receiver 2221, which receives the transaction request from the Transom 2203. The Request Data 2230 may include a Product ID 2231, a Request Type 2232, a Transom Identifier 2233, a Virtual Entity Identifier 2234, and an Event Identifier 2235. Additional Request Data 2230 may be received by the Request Receiver 2221 as is desired. These identifiers may in some embodiments be shares of the shared secret to enable identity verification.

The Request Receiver 2221 is coupled to the Identity Verifier 2223, which identifies the Second User 900 based upon the shared secret information. Identity Verifier 2223 couples to the Identity Information Collator 2224 and the Identity Reporter 2225.

The Identity Information Collator 2224 vets the Second User 900 to develop identity information. Identity Information 2250 utilized by the Identity Information Collator 2224 may include User Reputation 2252 data, such as credit reports or criminal records, and Virtual Entity Reputation 2251, such as peer ratings of the Second Virtual Entity 2202. This information from the Identity Information Collator 2224 is used for outputting to the First User 2204 and for the generation of the virtual entity gallery. Identity Information Collator 2224 couples to the Identity Reporter 2225 and the Virtual Entity Gallery Generator 2226.

The Identity Reporter 2225 outputs the identity verification along with vetted Identity Information 2250. Output Data 2260 includes Collected Reputation 2261 and Generated Reputation 2262.

The Virtual Entity Gallery Generator 2226 utilizes the vetted Identity Information 2250_to compile a Virtual Entity Gallery 2240. The Virtual Entity Gallery 2240 includes Virtual Entity Profiles 2242a, 2242b to 2242w for each Second Virtual Entity 2202 belonging to the Second User 900, as well as a Second User Profile 2241. The profiles may be linked to form a comprehensive profile. These profiles may be searchable and include microformats for ready data retrieval and semantic analysis.

Figure 23:
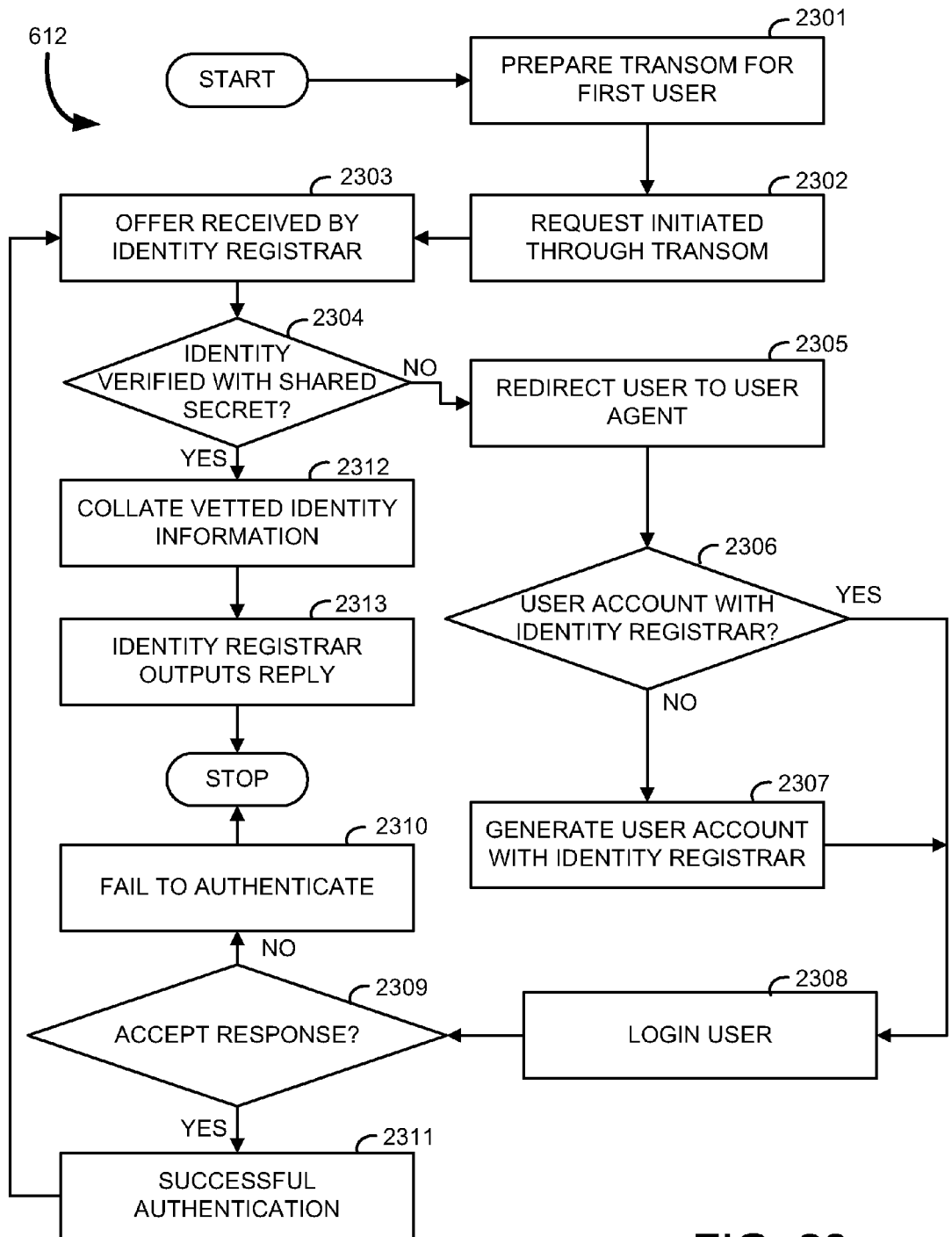
FIG. 23 shows a flow chart illustrating the process for authenticating an avatar for the avatar authentication system of FIG. 22A.

FIG. 23 shows a flow chart illustrating the process for authenticating an avatar, shown generally at 612. The process begins, at step 2301, by preparing the Transom 2203 for the First User 2204. Preparation of First User 2204 includes the registration of at least one Transom 2203.

Then, in step 2302, a request is initiated through the Transom 2203. In some embodiments, requests may be initiated by the Second User 900 exclusively through the Transom 2203. Alternatively, in some embodiments, both the Second User 900 and the First User 2204 are capable of initiating a request through the Transom 2203. In some of these embodiments, requests initiated by Second User 900 may be treated differently than requests initiated by First User 2204. Moreover, in some embodiments, the type of request may further impact the treatment of the request. Moreover, classes of First Users 2204 may be delegated, wherein requests from different classes of First Users 2204 are given disparate treatment.

At step 2303, an offer is sent to and received by the Identity Registrar 126. The offer is typically conveyed through the Transom 2203, via the WAN 101, to Identity Registrar 126. The offer contains information on both the Avatar 221*a* to 221*t* or Second Virtual Entity 2201, and Transom 2203. After receiving the offer, an inquiry is made as to whether Second User 900 has been authenticated within the current Virtual Environments 211*b* on a previous occasion in order to verify identity, at step 2304. If the Second User 900 has been previously authenticated, or identity is verified, then the process proceeds to step 2312, where the Identity Registrar 126 collates the vetted Identity Information 2250. Then at step 2313, the Identity Registrar 126 replies with identity information 2250. The process then ends.

Otherwise, if at step 2304, the Second User 900 has not been previously authenticated within the current Virtual Environments 211*b*, then the process proceeds to step 2305, where Identity Registrar 126 redirects Second User 900 to the User Agent 2206 for authentication with Identity Registrar 126. Then, at step 2306, an inquiry is made if Second User 900 has an account with Identity Registrar 126. If Second User 900 has an account with Identity Registrar 126, then Second User 900 is directed to login to her account at step 2308.

Else, if at step 2306, Second User 900 does not have an account with Identity Registrar 126, then the process progresses to step 2307, where an account for Second User 900 is generated with the Identity Registrar 126. In some embodiments, generation of the account may involve the input of at least one of a username, password, personal information, Avatar 221*a* to 221*t* or Second Virtual Entity 2201 information, and authentication preferences. In the case of a managed Persistent Avatar 221*a* to 221*t*, the authentication preferences may be configured in the Avatar Authentication Preferencer 910. Additionally, in some embodiments, the Second User 900 account may be updated by either Second User 900 or Identity Registrar 126 as new information becomes available, to correct erroneous information, or to change Second User 900 authentication preferences. Then, after Second User 900 account generation, the process proceeds to step 2308, where Second User 900 is directed to login to her account. Then, at step 2309, an inquiry is made whether to accept the response. If the response is denied, then authentication fails at step 2310. The process then ends with the Second User 900 not being authenticated.

Otherwise, if at step 2309, the response is accepted, then at step 2311, the authentication is successful. The process then returns to step 2303, where an offer is sent to Identity Registrar 126. As stated earlier, the offer is typically conveyed through the Transom 2203, via the WAN 101, to Identity Registrar 126. The offer contains information on both the Avatar 221*a* to 221*t*, or Second Virtual Entity 2201, and Transom 2203. After receiving the offer, an inquiry is made as to whether Second User 900 has been authenticated within the current Virtual Environments 211*b* on a previous occasion, at step 2304. Since Second User 900 has been previously authenticated at step 2311, the process proceeds to step 2312, where the Identity Registrar 126 collates the vetted Identity Information 2250. Then at step 2313, the Identity Registrar 126 replies with the identity information 2250. The process then ends.

Figure 24:
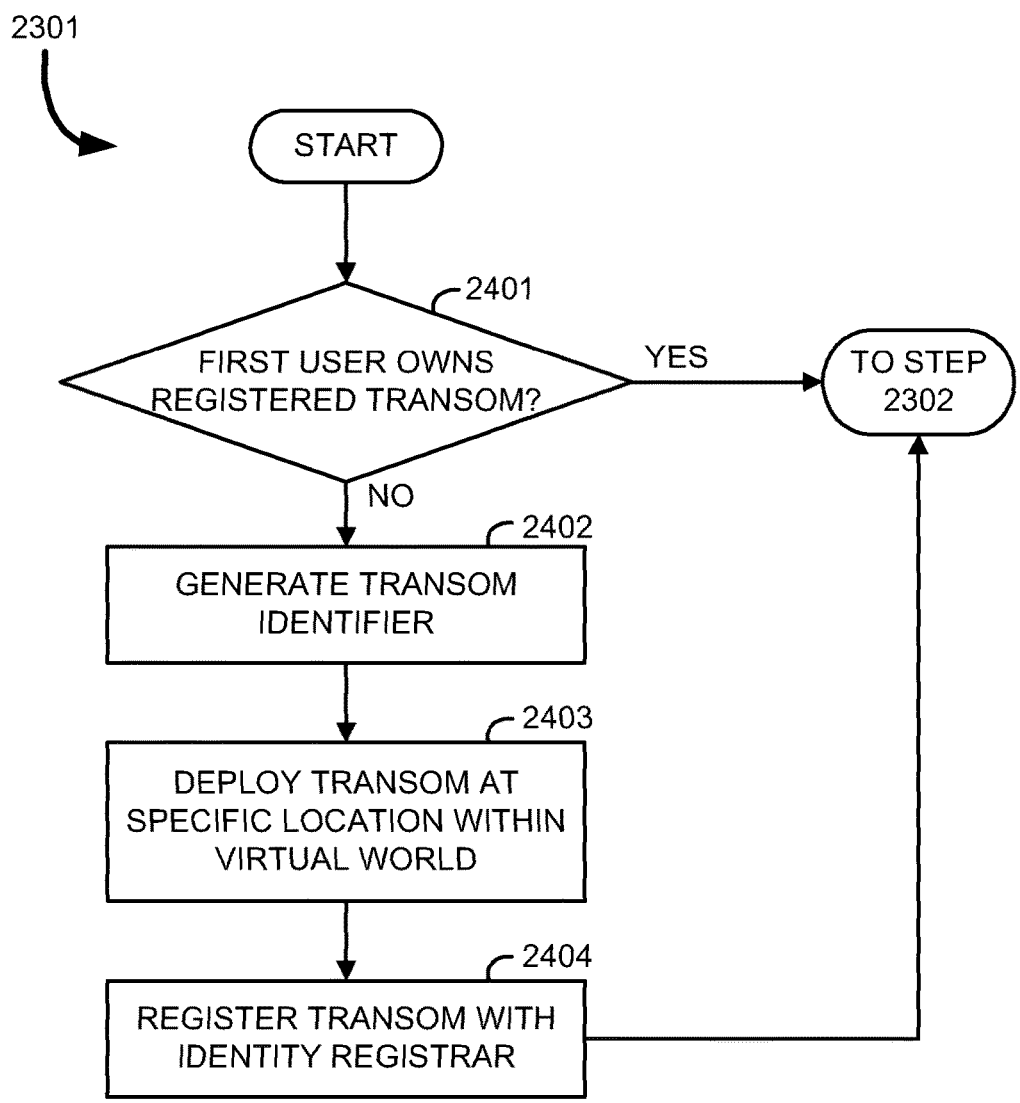
FIG. 24 shows a flow chart illustrating the process for preparing the first user for the avatar authentication system of FIG. 22A.

FIG. 24 shows a flow chart illustrating the process for preparing the First User 2204, shown generally at 2301. The process begins at step 2401, where an inquiry is made whether First User 2204 owns a Transom 2203 registered with Identity Registrar 126. If First User 2204 owns a Transom 2203 registered with Identity Registrar 126 the process ends by progressing to step 2302.

Otherwise, if First User 2204 does not own a Transom 2203 registered with Identity Registrar 126, a Transom 2203 identifier is generated at step 2402. In some embodiments, each Transom 2203 identifier is unique to its Transom 2203. Then, at step 2403, the Transom 2203 is deployed at a specific location within the Virtual Environment 211*b*. The location of deployment may be dictated by First User 2204 or in some embodiments Identity Registrar 126 dictates the deployment location. Then, at step 2404, the Transom 2203 registers with Identity Registrar 126. Registration may include the unique identifier as well as the location information. In some embodiments, transoms convey their identifier information and location information to Identity Registrar 126 when making an offer. In this way the transoms provide their share of the shared secret during the Second User 900 authentication. After registration of the Transom 2203, the process ends by progressing to step 2302.

Figure 25:
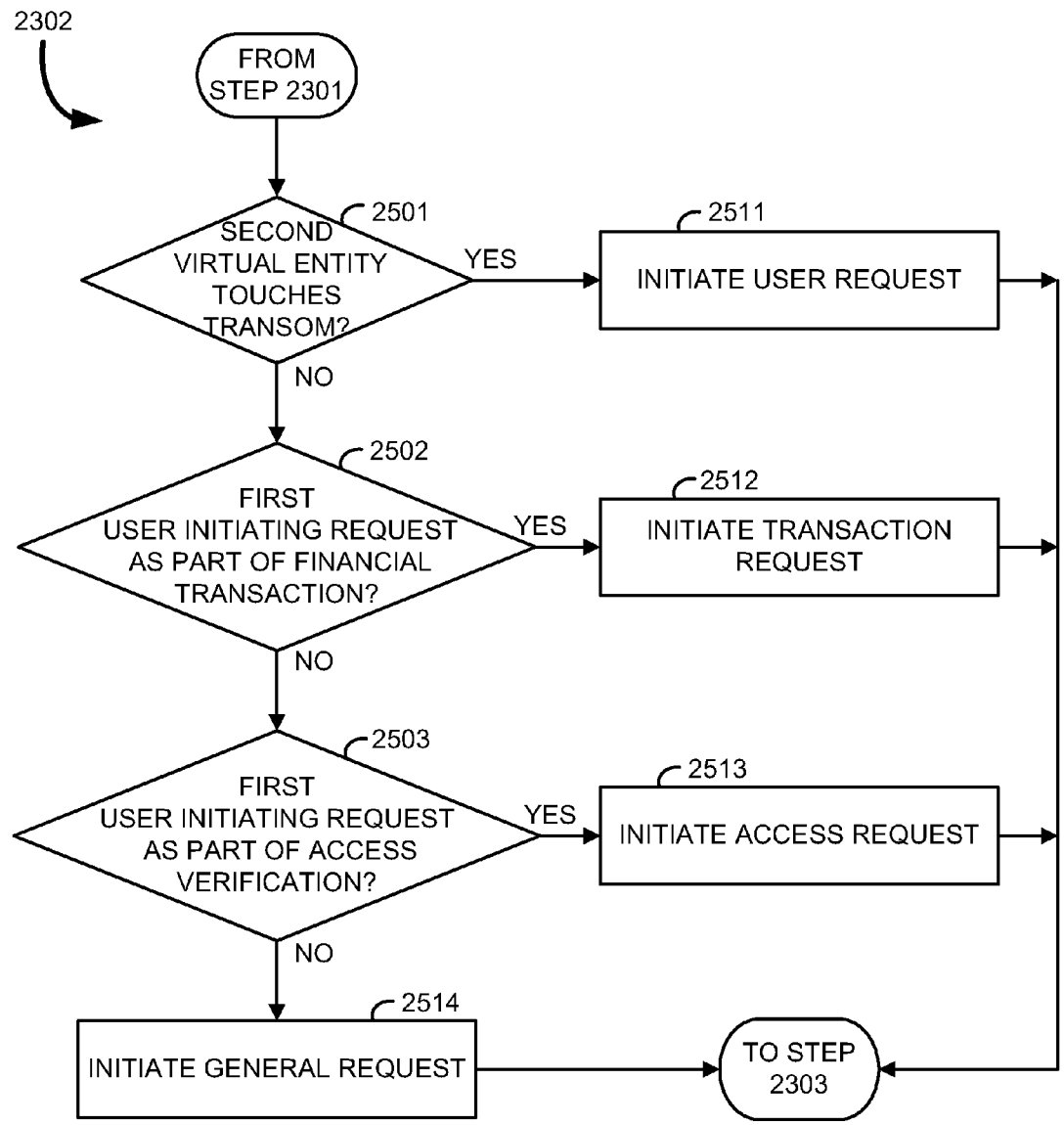
FIG. 25 shows a flow chart illustrating the process for initiating an authentication request for the avatar authentication system of FIG. 22A.

FIG. 25 shows a flow chart illustrating the process for initiating an authentication request, shown generally at 2302. The process begins from step 2301, and then proceeds to step 2501, where an inquiry is made as to whether the Second User 900 touches the Transom 2203. It should be noted that "touches", as is used here, is intended to be a generic word for "interacts with". In some embodiments, the graphical representation of the Transom 2203 must be touched by the Second Virtual Entity 2201. In other embodiments, the Transom 2203 may be spoken to. In yet other embodiments, the Second Virtual Entity 2201 need only come within a predetermined proximity of the Transom 2203. As such, the "touches", as disclosed, is any action made by Second User 900 intended to cause a request initiated by Second User 900. If the Second User 900 touches the Transom 2203, then an Second User 900 request is initiated at step 2511. The process then ends by progressing to step 2303.

Otherwise, if at step 2501, Second User 900 does not touch the Transom 2203, then an inquiry is made if First User 2204 is initiating the request as part of a financial transaction, at step 2502. Such a request may be generated at any commercial juncture prior completion of sales. In some embodiments, the request may be performed immediately prior finalization of a purchase, or contract, as to prevent reckless misuse of financial requests. If First User 2204 is initiating the request as part of a financial transaction, then a transaction request is initiated at step 2512. The process then ends by progressing to step 2303.

Else, if at step 2502 First User 2204 is not initiating the request as part of a financial transaction, then an inquiry is made if First User 2204 is initiating the request as part of access verification at step 2503. Such a request is intended to be initiated when the Second User 900 is attempting to enter a restricted portion of the Virtual Environment 211*b*, or gain access to restricted information. Such request types have particular repercussions for parental controls and the restriction of mature material to a minor Second User 900. However, the request additionally has uses where admission of certain individuals is desired, and for the generation of a physical Virtual Private Network (VPN) of certain Second Users 900. If the First User 2204 is initiating the request as part of access verification, then an access request is initiated at step 2513. The process then ends by progressing to step 2303.

Otherwise, if at step 2503, First User 2204 is not initiating the request as part of access verification, then a general request is initiated at step 2514. The process then ends by progressing to step 2303.

Figure 26:
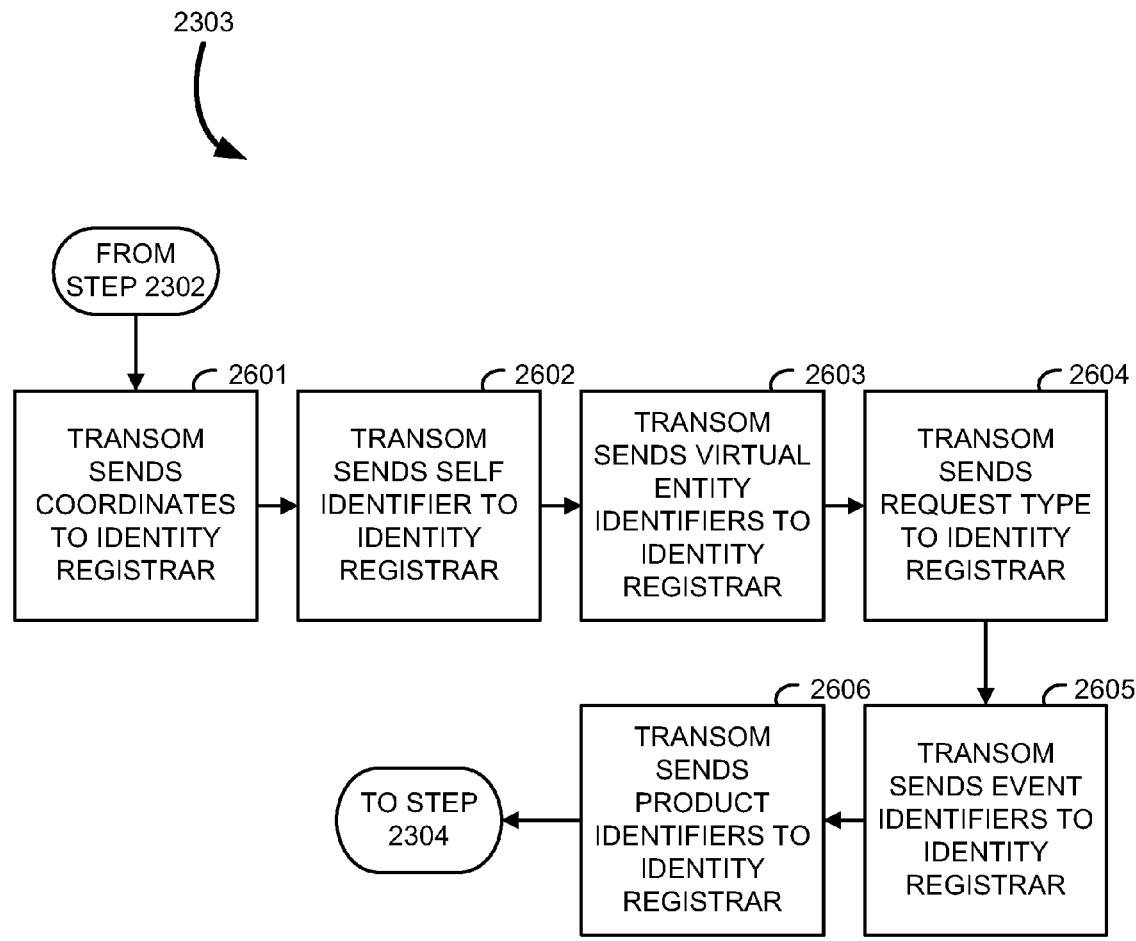
FIG. 26 shows a flow chart illustrating the process for an authentication offer for the avatar authentication system of FIG. 22A.

FIG. 26 shows a flow chart illustrating the process for an authentication offer, shown generally at 2303. The process begins from step 2302. Then step 2601, 2602, 2603 and 2604 proceed in parallel. By proceeding in parallel, any step may be completed independently of the other steps. As such, steps may be processed in any order, as well as simultaneously. In step 2601, the Transom 2203 sends its special location to Identity Registrar 126. In step 2602, the Transom 2203 sends its unique identifier to Identity Registrar 126. Steps 2601 and 2602 constitute the share of First User 2204 for the shared secret.

In some embodiments, each Virtual Environment 211b assigns a unique identifier to each Second Virtual Entity 2201. Such unique Second Virtual Entity 2201 identifiers may be a key, guide, etc. In step 2603, the Transom 2203 sends unique identifiers of the Second User's 900 Second Virtual Entity 2201 to the Identity Registrar 126. This constitutes the Second User's 900 share of the shared secret.

In step 2604, the Transom 2203 sends the request type to the Identity Registrar 126. The request type may affect the response type, depending upon the Second User's 900 authentication preferences, and the manner of account Second User 900 has with Identity Registrar 126.

In step 2605, the Transom 2203 sends event identifiers to the Identity Registrar 126. In step 2606, the Transom 2203 sends product identifiers to the Identity Registrar 126. Event and product identifiers may be referenced with the Second User's 900 account to determine the proper response by the Identity Registrar 126. For Example, if the event involves an access fee to a club, with identification and automated billing, the specifics of the event and products offered may be compared with Second User 900 preferences when determining what level of notification to the Second User 900 is appropriate.

After steps 2601, 2602, 2603, 2604, 2605 and 2606 all complete the process ends by proceeding to step 2304.

Figure 27:
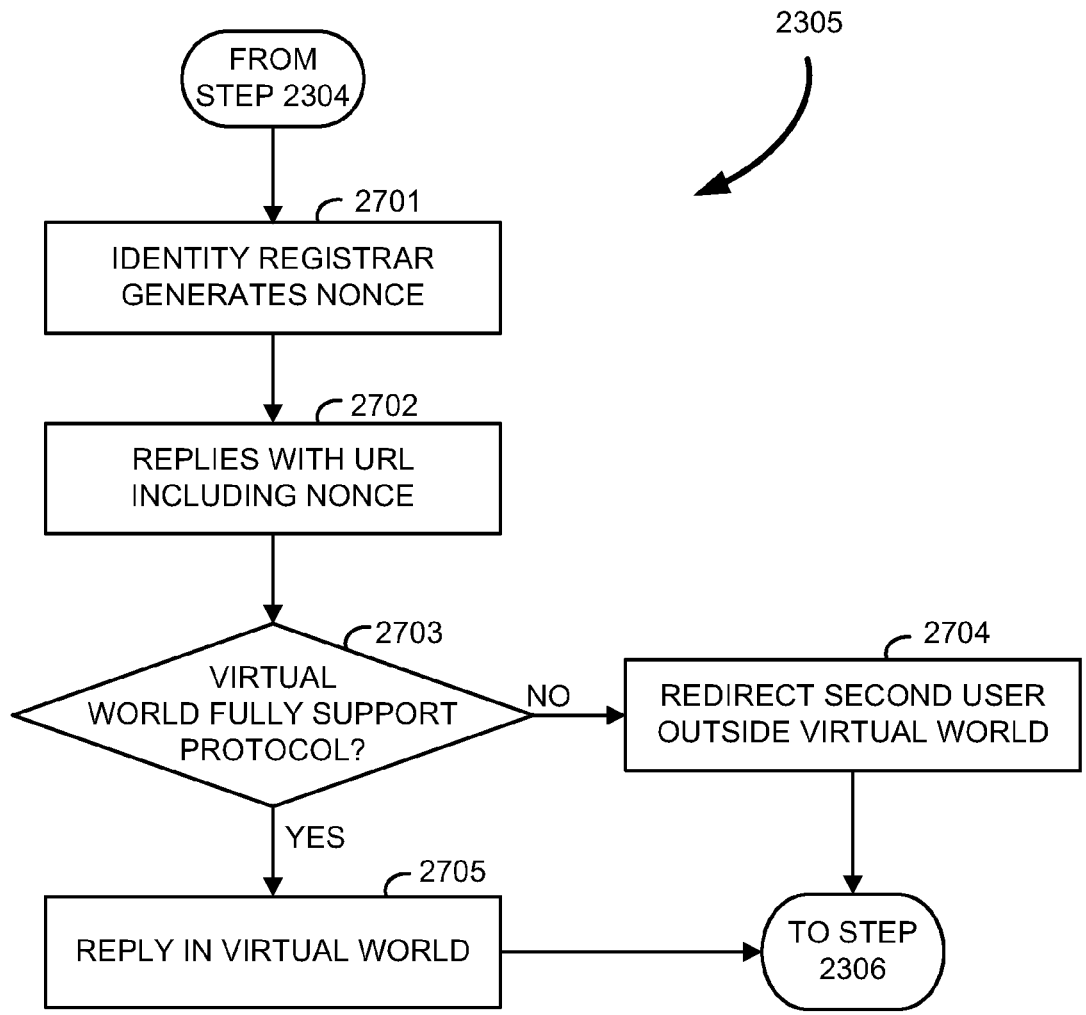
FIG. 27 shows a flow chart illustrating the process for redirecting an user for the avatar authentication system of FIG. 22A.

FIG. 27 shows a flow chart illustrating the process for redirecting an Second user, shown generally at 2305. The process begins from step 2304. At step 2701, Identity Registrar 126 generates a nonce. A nonce is a number, or bit string, that is often random or pseudo-random. A nonce is used only once to ensure that old communications cannot be reused in replay attacks.

Then, at step 2702, the Identity Registrar 126 replies to Second User 900 through the User Agent 2206. Then, at step 2703, an inquiry is made if the Virtual Environment 211b fully supports the protocol in-world. If the Virtual Environment 211b supports the protocol in-world, the reply may be displayed in-world at step 2705. Such in-world replies minimize the interference that redirecting has upon the Second User 900. The process then ends by proceeding to step 2306. In some embodiments the User Agent 2206 may include a web based program in HTML. In such embodiments, the reply is a URL that includes the generated nonce. Additionally, any appropriate protocol, such as HTML, XML or WAP may be utilized by the User Agent 2206 as is well known by those skilled in the art. Moreover, in some embodiments the User Agent 2206 may be capable of multiple protocols in order to maximize the number of in-world replies.

Otherwise, if, at step 2703, the Virtual Environment 211b does not support the protocol, then the Second User 900 is redirected outside the Virtual Environment 211b at step 2704. The process then ends by proceeding to step 2306.

Figure 28:
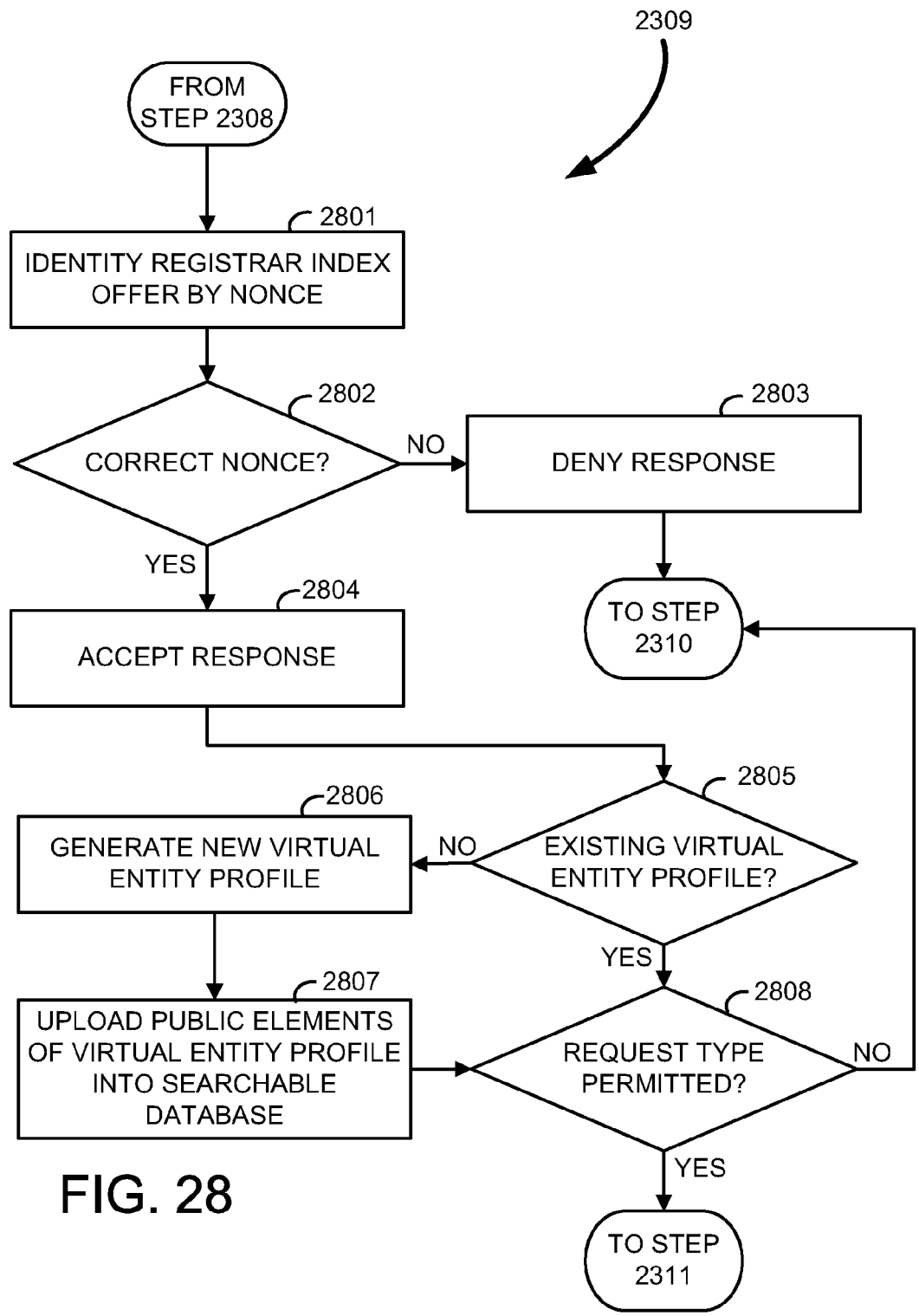
FIG. 28 shows a flow chart illustrating the process for determining authentication acceptance for the avatar authentication system of FIG. 22A.

FIG. 28 shows a flow chart illustrating the process for determining authentication acceptance, shown generally at 2309. The process begins from step 2308. At step 2801, the Identity Registrar 126 indexes the offer by the nonce provided by the Second User 900 from the redirect. Then, at step 2802, an inquiry is made as to if the nonce and the offer request match. If the nonce and the offer request do not match, then the response is denied at step 2803. The process then ends by proceeding to step 2310. This signifies a failed authentication.

Otherwise, if at step 2802 the nonce and the offer request do match, then the response is accepted at step 2804. Then, at step 2805, an inquiry is made whether there is an existing profile for the Avatar 221a to 221t, or Second Virtual Entity 2201. If there is no existing profile for the Second Virtual Entity 2201, then a new Second Virtual Entity 2201 profile is generated at step 2806. The new Second Virtual Entity 2201 profile updates the Second User 900 account with the Identity Registrar 126. Then, at step 2807, the public elements of the Second Virtual Entity 2201 profile are uploaded into the avatar gallery for public searches. The process then proceeds to step 2808, where an inquiry is made whether the request type is permitted.

Else, if at step 2805, there is an existing profile for the Second Virtual Entity 2201, then the process proceeds to step 2808, where an inquiry is made whether the request type is permitted. The request types, as delineated at step 2302 above, may include, in some embodiments, an Second User 900 request, a financial request, an access request and a general request. In some embodiments, a Second User 900 request will always be found permitted. Additional requests may be permitted according to the Second User's 900 account's authentication preferences. Thus, in theses embodiments, the Second User 900 is able to choose the level of anonymity desired, only authenticating when desired (or when First User 2204 requires it to complete a transaction, however Second User 900 may still refuse to authenticate). However, Second Users 900 may choose to authenticate in most situations in order to make transactions more efficient within the Virtual Environments 211b. Moreover, in some embodiments, the Second User 900 accounts may be required to authenticate under certain conditions as a term of the account. In such an embodiment, free accounts may be required to authenticate to Identity Registrar 126 deployed transoms, for the purpose of presenting highly targeted advertisements. However, premium/pay accounts may leave authentication preferences entirely in the Second User's 900 discretion.

If, at step 2808, the request type is permitted, then the process ends by proceeding to step 2311. This signifies a successful authentication. Otherwise, if at step 2808 the request type is not permitted, then the process ends by proceeding to step 2310. This signifies a failed authentication.

Figure 29:
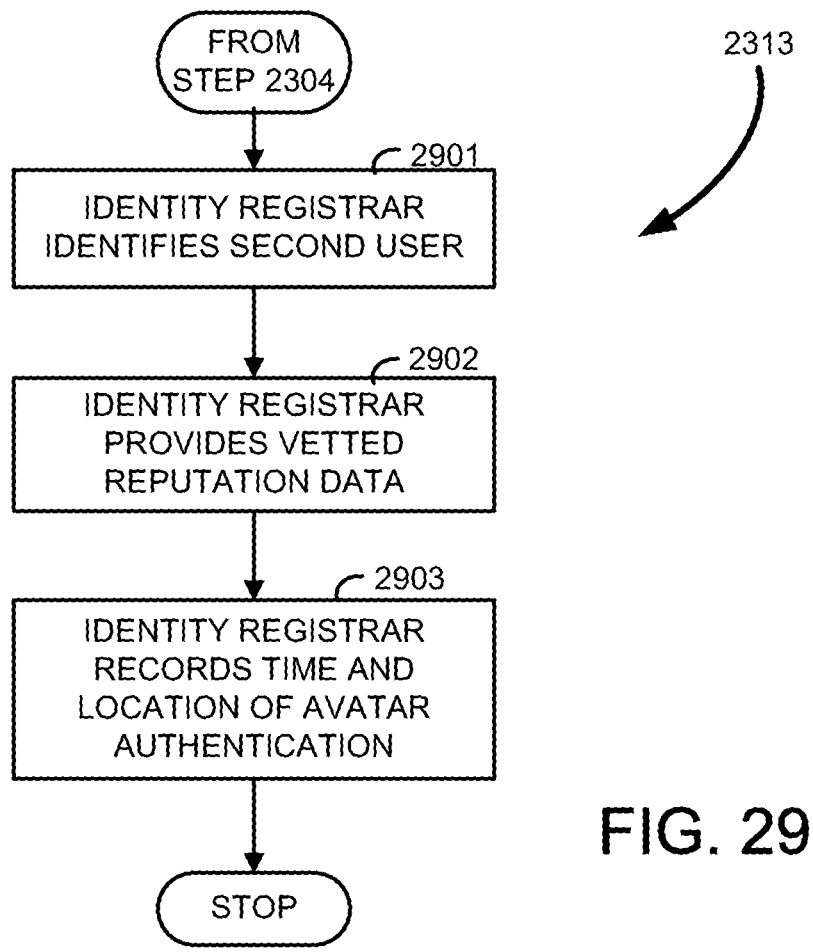
FIG. 29 shows a flow chart illustrating the process for replying to an authentication request for the avatar authentication system of FIG. 22A.

FIG. 29 shows a flow chart illustrating the process for replying to an authentication request, shown generally at step 2313. The process begins from step 2304. Step 2903 proceeds in parallel to the serial process beginning at step 2901. By proceeding in parallel, step 2903 may be completed independently of the other steps. As such, step 2903 may be processed in any order as related to the other steps, or may be processed simultaneously.

In step 2901, Identity Registrar 126 identifies the Second User 900. Then, in step 2902, Identity Registrar 126 provides vetted reputation data regarding Second User 900. In this way, the First User 2204 is able to properly grant access, or develop trust in a financial transaction. The reputation data for the Second User 900 may include data from many of the External Avatar, or virtual entity, Data Sources 2205*a* to 2205*v*. Additionally, reputation information may provide many forms of reputation information, such as personal "honesty", commerce history, peer reviews and even credit ratings. In some embodiments, the reputation data may include a "trust matrix", or "trust web", wherein the relationships between the Second User 900 and the First User 2204, and the opinions of each individual within that chain of relationships to one another, may be compiled and analyzed in order to generate a trust level for the First User 2204 to the Second User 900. For example, if the First User 2204 knows and highly trusts an intermediate party; and the intermediate party knows and highly trusts the Second User 900, then the trust matrix will generate a high trust value for the First User 2204 to the Second User 900. Moreover, with more relationship chains and trust data, more refined trust matrices may be developed.

Additionally, in some embodiments, the trust matrix may be rule based. In these embodiments, configurable rules may be utilized to hone the reputation information. For example, the First User 2204 may be a merchant interested in transaction reputation. In this exemplary trust matrix, rules as to which kind of relationship chains to be considered may be applied. In this case, personal or social relationship chains may be ignored in the generation of the trust matrix to the Second User 900 in favor of purely commercial relationship chains. Alternatively, the rule may be less restrictive, in that only the terminal relationship (i.e. the last intermediate to the Second User 900) is required to have a trust rating based upon commercial activity. Such a rule based system allows for the First User 2204 to generate their trust values off of what they believe is important, while ignoring additional data that may not be relevant.

Additionally, in some embodiments the vetted reputation information may include statistical abilities in order to profile characteristics. Statistics may be utilized to determine consistency between User's 900 Identity Information 2240 and to predict additional characteristics. Such statistical analysis provides an independent authentication validation, and has additional utility for targeted marketing. For example, a User 900 who states he is over 21 years of age, yet has characteristics in the Identity Information 2240 more consistent with a minor may be identified utilizing these techniques. The individuals that are identified may then be subject to additional scrutiny or higher authentication standards. Additionally, by determining a User's 900 characteristics highly tailored advertisements may be generated.

In step 2903, the Identity Registrar 126 records the time and location of the Second User 900 authentication. Such records are useful in determining Second User 900 trends, trouble-shooting, and marketing research. After steps 2902 and 2903 are complete, the process concludes.

The present invention may also be practiced with other techniques for providing an authentication for a Persistent Avatar 221*a* or any virtual entity. For example, it is possible to distribute the Authentication System 2200 across each of the Virtual Environments 211*b*. In such a system only a central database of profiles are required, which could then be accessed by the individual in-world Authentication Systems 2200.

In sum, the present invention provides an authentication system for avatars for providing identity and reputation of the avatar's Second user, thereby providing enhanced security, parental control and trust in e-commerce. Authentication system for avatars may be entirely software, entirely hardware, or a combination of software and hardware. The advantages of such an efficient system include ease of working within a multitude of virtual environments, the creation of an avatar gallery, efficiency and economy for the virtual environments, and positive repercussions for targeted marketing and e-commerce.

Although the present invention has been described in considerable detail with reference to exemplary embodiments, modifications, variations, permutations, and substitute equivalents may be made to the disclosed embodiments while remaining within the subject and spirit of the invention. Therefore, the spirit and scope of the appended claims should not be limited to the description of the versions contained herein.

What is claimed is:

1. A method for authenticating an avatar for identity, useful in conjunction with an avatar, at least one virtual environment, and an end user, wherein the end user utilizes the avatar within at least one of the at least one virtual environment, the method for authenticating an avatar for identity comprising:
generating at least one transom, wherein each transom includes a unique transom identifier and is configured to exist in a specific location within the at least one virtual environment;
registering the at least one transom with an identity provider;
initiating an authentication request through the at least one transom wherein the authentication request includes an authentication request type;
acquiring an avatar identifier for the avatar;
conveying an offer, wherein the offer includes the unique transom identifier, the specific location the transom exists and the avatar identifier;
authenticating the avatar, wherein the authentication utilizes a shared secret; and
responding to the offer with avatar identification information.

2. The method for authenticating an avatar, as recited in claim 1, wherein the identification information includes end user reputation.

3. The method for authenticating an avatar, as recited in claim 2, wherein the end user reputation includes a plurality of reputation scores.

4. The method for authenticating an avatar, as recited in claim 3, wherein the end user reputation is compiled from at least one external avatar data source.

5. The method for authenticating an avatar, as recited in claim 4, wherein each transom is managed by a relying party.

6. The method for authenticating an avatar, as recited in claim 4, wherein the end user reputation compiled from at least one external avatar data sources utilizes a trust matrix, wherein the trust matrix generates a trust rating for the end user by analyzing relationships between the end user and the relying party through at least one intermediate party.

7. The method for authenticating an avatar, as recited in claim 4, wherein the at least one external avatar data source compiles reputation information on the avatar.

8. The method for authenticating an avatar, as recited in claim 4, wherein the at least one external avatar data source compiles reputation information on the end user.

9. The method for authenticating an avatar, as recited in claim 1, wherein the authenticating the avatar includes: determining if the avatar has been previously authenticated, and if the avatar has been previously authenticated, then authenticating the avatar, else: redirecting the end user to a user agent, wherein the redirecting includes generating a nonce; generating an account, for the end user, with the identity provider; logging the end user into the account; comparing the generated nonce with the offer; and authenticating the avatar.

10. The method for authenticating an avatar, as recited in claim 9, wherein the redirecting the end user to the user agent includes in-world redirection if the virtual environment supports user agent protocol, else redirecting the end user out of world.

* * * * *